(12) United States Patent
Swanger et al.

(10) Patent No.: US 11,126,445 B1
(45) Date of Patent: Sep. 21, 2021

(54) DISPARATE DATA AGGREGATION FOR USER INTERFACE CUSTOMIZATION

(71) Applicant: C/HCA, Inc., Nashville, TN (US)

(72) Inventors: Cae Swanger, Las Vegas, NV (US); Steve Killian, Henderson, NV (US)

(73) Assignee: C/HCA, Inc., Nashville, TN (US)

( * ) Notice: Subject to any disclaimer, the term of this patent is extended or adjusted under 35 U.S.C. 154(b) by 0 days.

(21) Appl. No.: 16/849,193

(22) Filed: Apr. 15, 2020

Related U.S. Application Data

(63) Continuation of application No. 16/545,998, filed on Aug. 20, 2019, now Pat. No. 10,628,180.

(60) Provisional application No. 62/720,022, filed on Aug. 20, 2018.

(51) Int. Cl.
*G06F 9/451* (2018.01)
*G06F 3/048* (2013.01)
*G06Q 10/00* (2012.01)
*G06F 16/28* (2019.01)

(52) U.S. Cl.
CPC ............ *G06F 9/451* (2018.02); *G06F 16/287* (2019.01); *G06F 3/048* (2013.01); *G06Q 10/00* (2013.01)

(58) Field of Classification Search
CPC ........ G06F 9/451; G06F 16/287; G06F 3/048; G06Q 10/00
See application file for complete search history.

(56) References Cited

U.S. PATENT DOCUMENTS

| | | |
|---|---|---|
| 5,537,618 A | 7/1996 | Boulton et al. |
| 7,386,565 B1 | 6/2008 | Singh et al. |
| 8,452,630 B1 | 5/2013 | Fisher et al. |
| 9,100,483 B1 | 8/2015 | Snedden |
| 9,105,000 B1 | 8/2015 | White et al. |
| 9,201,985 B2 | 12/2015 | Elias et al. |
| 9,576,263 B2 | 2/2017 | Beck et al. |
| 9,892,380 B2 | 2/2018 | Naghshin et al. |
| 10,095,471 B2 | 10/2018 | Dwivedi et al. |
| 10,628,180 B1 | 4/2020 | Swanger et al. |
| 2006/0047704 A1 | 3/2006 | Gopalakrishnan |
| 2008/0065580 A1 | 3/2008 | Spence et al. |
| 2009/0154667 A1 | 6/2009 | Hao et al. |
| 2013/0124965 A1 | 5/2013 | Elias et al. |
| 2014/0379851 A1 | 12/2014 | LeCroy et al. |
| 2015/0082219 A1 | 3/2015 | Beck et al. |
| 2015/0089373 A1 | 3/2015 | Dwivedi et al. |
| 2015/0378528 A1 | 12/2015 | Ramanathan et al. |
| 2016/0042049 A1 | 2/2016 | Shilts et al. |
| 2016/0085914 A1 | 3/2016 | Douglass et al. |
| 2016/0162532 A1 | 6/2016 | Zhang et al. |

*Primary Examiner* — Hugo Molina
(74) *Attorney, Agent, or Firm* — Kilpatrick Townsend & Stockton, LLP

(57) ABSTRACT

In some examples, there may be provided systems, devices, and methods for using data from disparate databases to determine characteristics of a set of users within an organizational unit and generate customized user interface elements for display within a user interface.

20 Claims, 18 Drawing Sheets

DISPARATE DATA AGGREGATION FOR USER INTERFACE CUSTOMIZATION

CROSS REFERENCE TO RELATED APPLICATIONS

This application is a continuation of U.S. patent application Ser. No. 16/545,998, filed Aug. 20, 2019, which claims the benefit of and priority to U.S. Provisional Application No. 62/720,022, filed Aug. 20, 2018, the entire contents of each is hereby incorporated by reference for all purposes.

BACKGROUND

The amount of data generated each day continues to grow. In some environments, some of this data may be generated and stored by disparate sources be stored, while a majority of it may be evaluated and abandoned or ignored. Users and computing devices are beginning to rely more and on this data to make decisions. This may be especially true when the data is introduced as part of an operational flow. However, the time required to sort through stored data can create inefficiencies and, in some examples, may prove difficult given the disparate approaches for storing the data.

SUMMARY

This specification relates in general to aggregating data from disparate data sources in a network environment and, but not by way of limitation, to aggregating the data and using the data for generation of customized user interfaces.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: retrieving, from a first database associated with a first computer system, first data corresponding to reserved blocks of a plurality of users during a predefined period. The computer-implemented method also includes retrieving, from a second database associated with a second computer system, second data corresponding to a portion of the predefined period, the second data including a plurality of activity actions obtained from at least one capture device. The computer-implemented method also includes retrieving, from a third database, third data defining exchange conditions. The computer-implemented method also includes determining first time for each of the plurality of users based at least in part on the first data from the first database, the second data from the second database, and the third data from the third database. The computer-implemented method also includes determining second time for each of the plurality of users based at least in part on the first data from the first database; categorizing each user of the plurality of users into one of a plurality of categories by at least. The computer-implemented method also includes determining a third time based on the first time and the second time for the respective user. The computer-implemented method also includes filtering the third time with respect to a set of levels. The computer-implemented method also includes assigning each user to one of the plurality of categories based at least in part on filtering the third time. The computer-implemented method also includes generating a first user interface element corresponding to a first category of the plurality of categories. The computer-implemented method also includes providing a user interface for presentation at a user device that includes the first user interface element displayed in association with each user categorized into the first category. Other embodiments of this aspect include corresponding computer systems, apparatus, and computer programs recorded on one or more computer storage devices, each configured to perform the actions of the methods.

One general aspect includes a system, including: a memory configured to store computer-executable instructions, and a processor configured to access the memory and execute the computer-executable instructions to at least: retrieve, from a first database associated with a first computer system, first data corresponding to reserved blocks of a plurality of users during a predefined period. The processor is also configured to retrieve, from a second database associated with a second computer system, second data corresponding to a portion of the predefined period, the second data including a plurality of activity actions obtained from at least one capture device. The processor is also configured to retrieve, from a third database, third data defining exchange conditions. The processor is also configured to determine that a first user of the plurality of users accrues first extra time by arriving before a first reserved block based on the first data from the first database, the second data from the second database, and the third data from the third database. The processor is also configured to determine that the first user accrues second extra time by leaving after the first reserved block based on the first data from the first database, the second data from the second database, and the third data from the third database. The processor is also configured to generate a first user interface element corresponding to the first extra time. The processor is also configured to generate a second user interface element corresponding to the second extra time. The processor is also configured to provide a user interface for presentation at a user device, the user interface including the first user interface element and the second user interface element displayed in association with the first user. Other embodiments of this aspect include corresponding computer-implemented methods, apparatus, and computer programs recorded on one or more computer storage devices, each configured to perform the actions of the methods.

Other objects, advantages, and novel features of the present disclosure will become apparent from the following detailed description of the disclosure when considered in conjunction with the accompanying drawings.

BRIEF DESCRIPTION OF THE DRAWINGS

Various examples in accordance with the present disclosure will be described with reference to the drawings, in which.

DETAILED DESCRIPTION

The ensuing description provides preferred exemplary example(s) only, and is not intended to limit the scope, applicability or configuration of the disclosure. Rather, the ensuing description of the preferred exemplary example(s) will provide those skilled in the art with an enabling description for implementing a preferred exemplary example. It is understood that various changes may be made in the function and arrangement of elements without departing from the spirit and scope as set forth in the appended claims.

Figure 1:
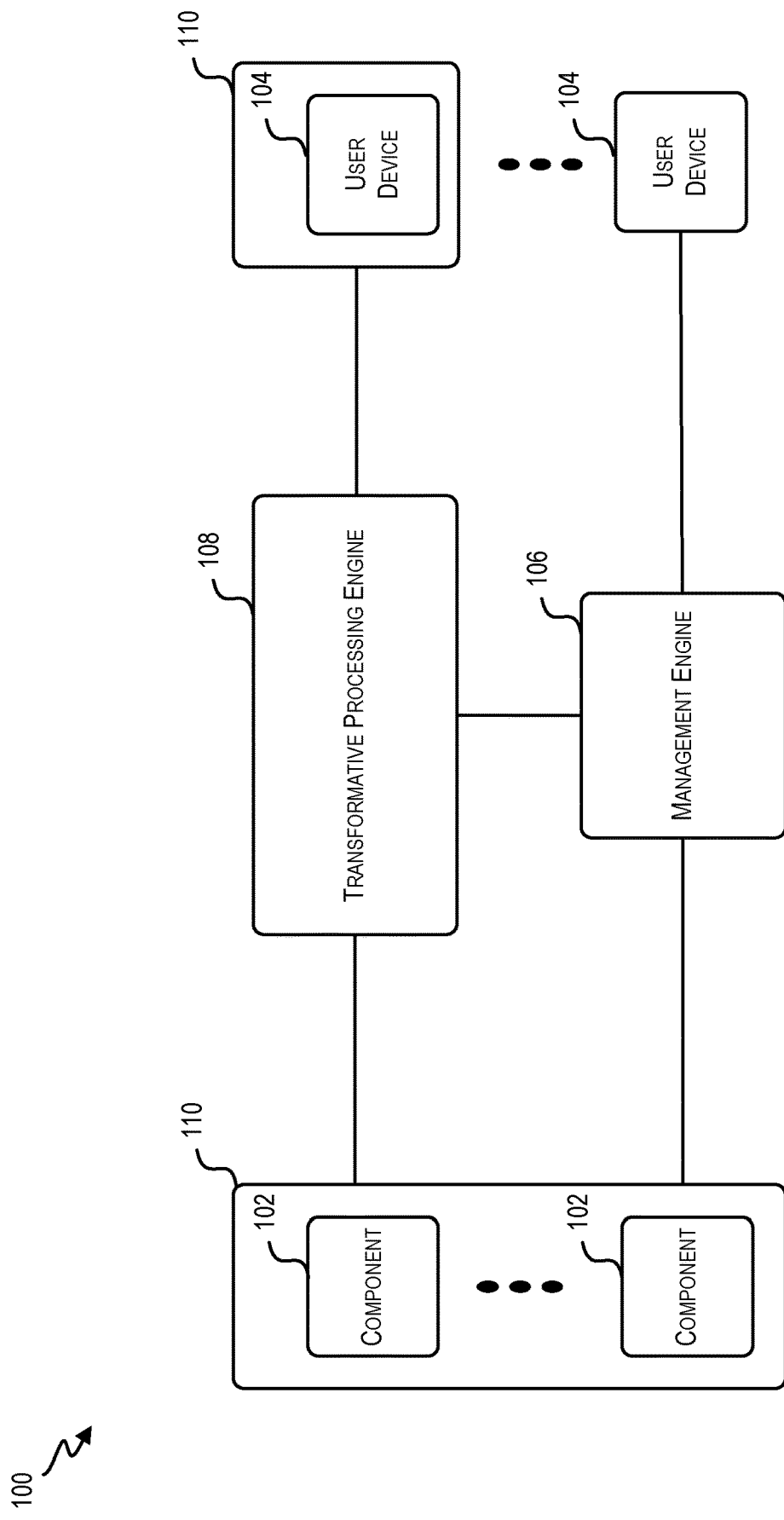
FIG. 1 is an example block diagram illustrating an interaction system in which techniques relating to aggregating data from disparate data sources for user interface customization may be implemented, according to at least one example.

Referring first to FIG. 1, a block diagram of an example of an interaction system 100 is illustrated. Generally, in interaction system 100, data can be generated at one or more system components 102 and/or user devices 104. Management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect input received at an interface of the device. The input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect input requesting particular data, to generate a request communication (e.g., to be sent to transformative processing engine), to receive the requested data and/or to present the received data.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or focus. Exemplary types of facilities include server farm facilities, web-server facilities, data-storage facilities, telecommunication facilities, service facilities, and/or operational facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, accessibility, location, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
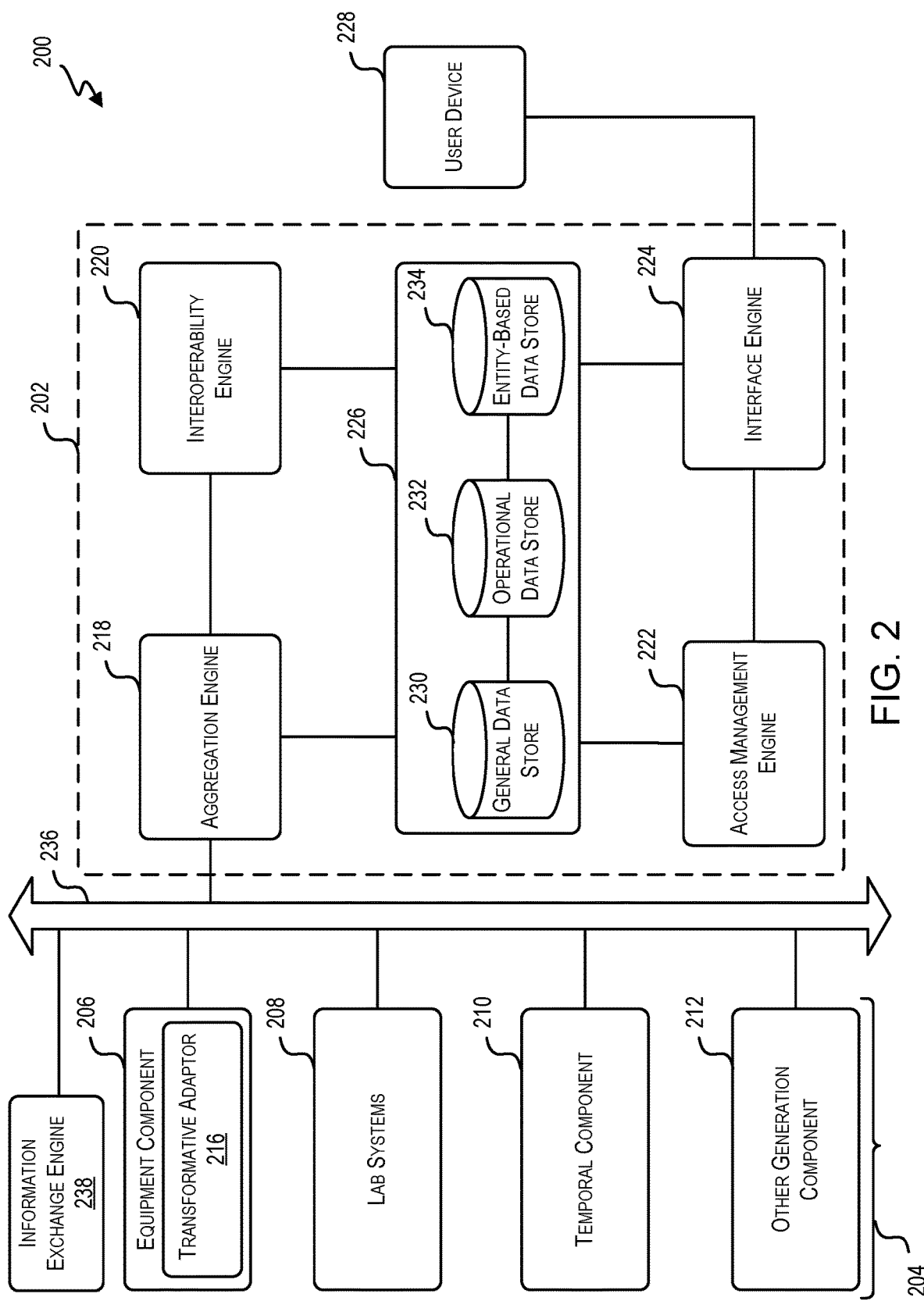
FIG. 2 is an example block diagram illustrating an interaction system in which techniques relating to aggregating data from disparate data sources for user interface customization may be implemented, according to at least one example.

Referring next to FIG. 2, a block diagram of an example of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a temporal component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Temporal component 210 may include any suitable computing devices used with respect to interaction system 200. For example, temporal component 210 can be configured to allocate a resource to a particular entity during a particular temporal window. Temporal component 210 can monitor a schedule for the resource and can identify one or more available temporal windows that may be secured by a particular entity. Upon receiving an indication, temporal component 210 may update a schedule of a resource to reflect that a particular temporal window is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the location and other details about the component or the user device. In some examples, the component and the user device may include global positioning chips that are configured to determine a geolocation.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized user devices. The information exchange engine 238 is also configured to route inbound messages and route outbound messages, as described herein. The information exchange engine 238 is also configured to generate customized messages based on dependent user data.

Figure 3:
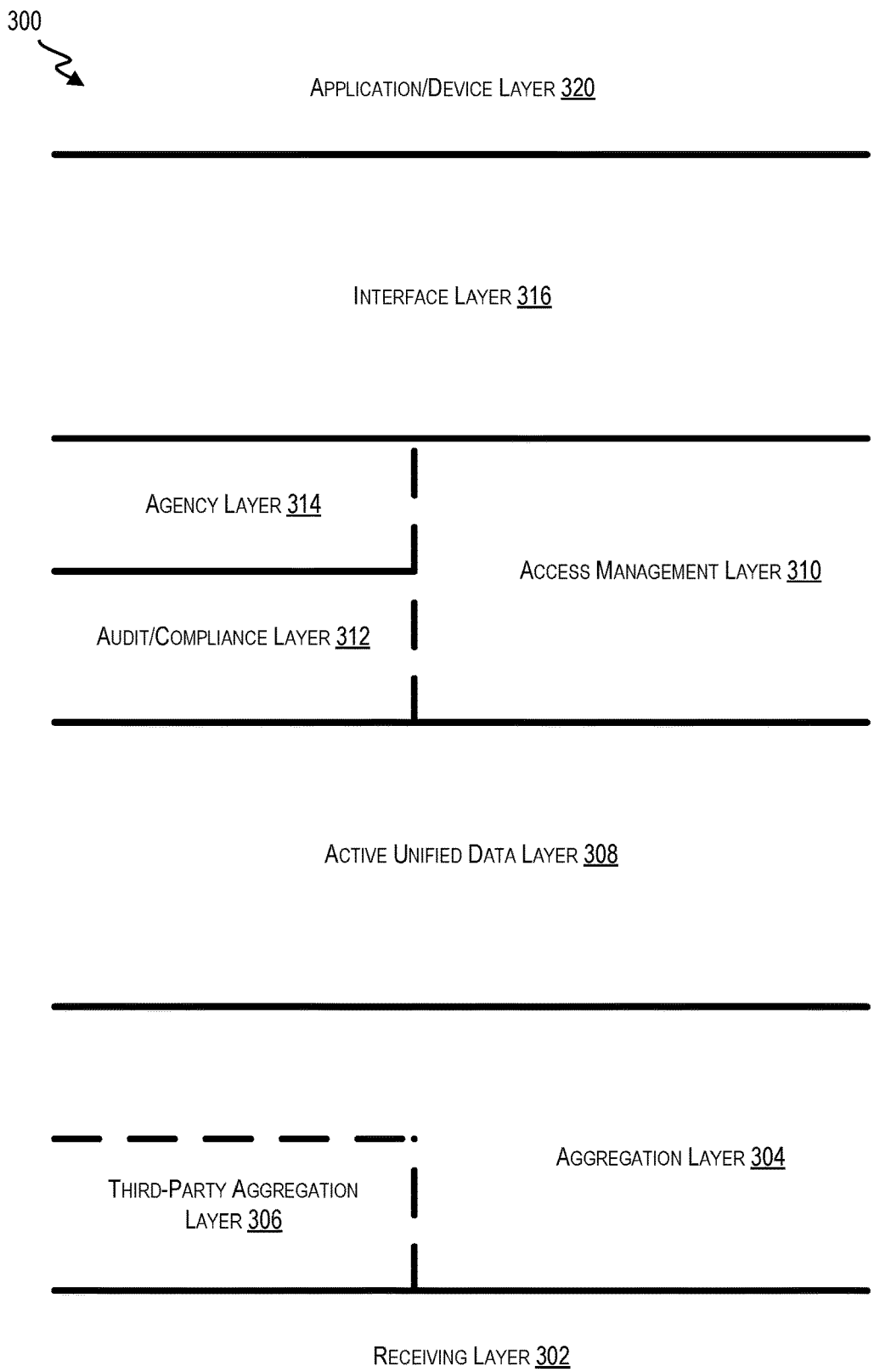
FIG. 3 is an example schematic model illustrating a network communication model in which techniques relating to aggregating data from disparate data sources for user interface customization may be implemented, according to at least one example.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties.

Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
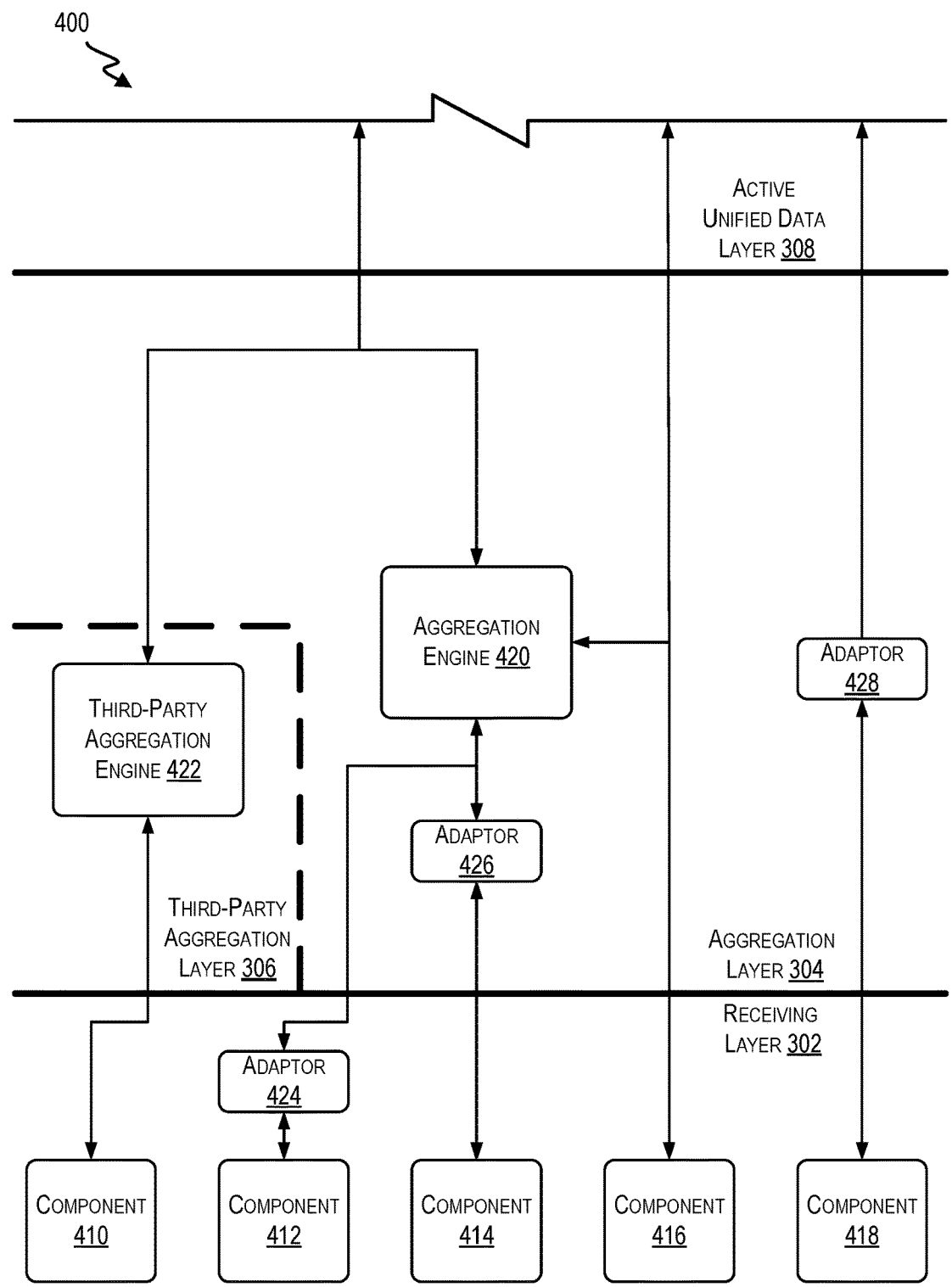
FIG. 4 is an example schematic model illustrating an aspect of the network communication model of FIG. 3 in more detail.

Turning next to FIG. 4, a diagram 400 is shown that depicts a portion of architecture stack 300 according to at least one example. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
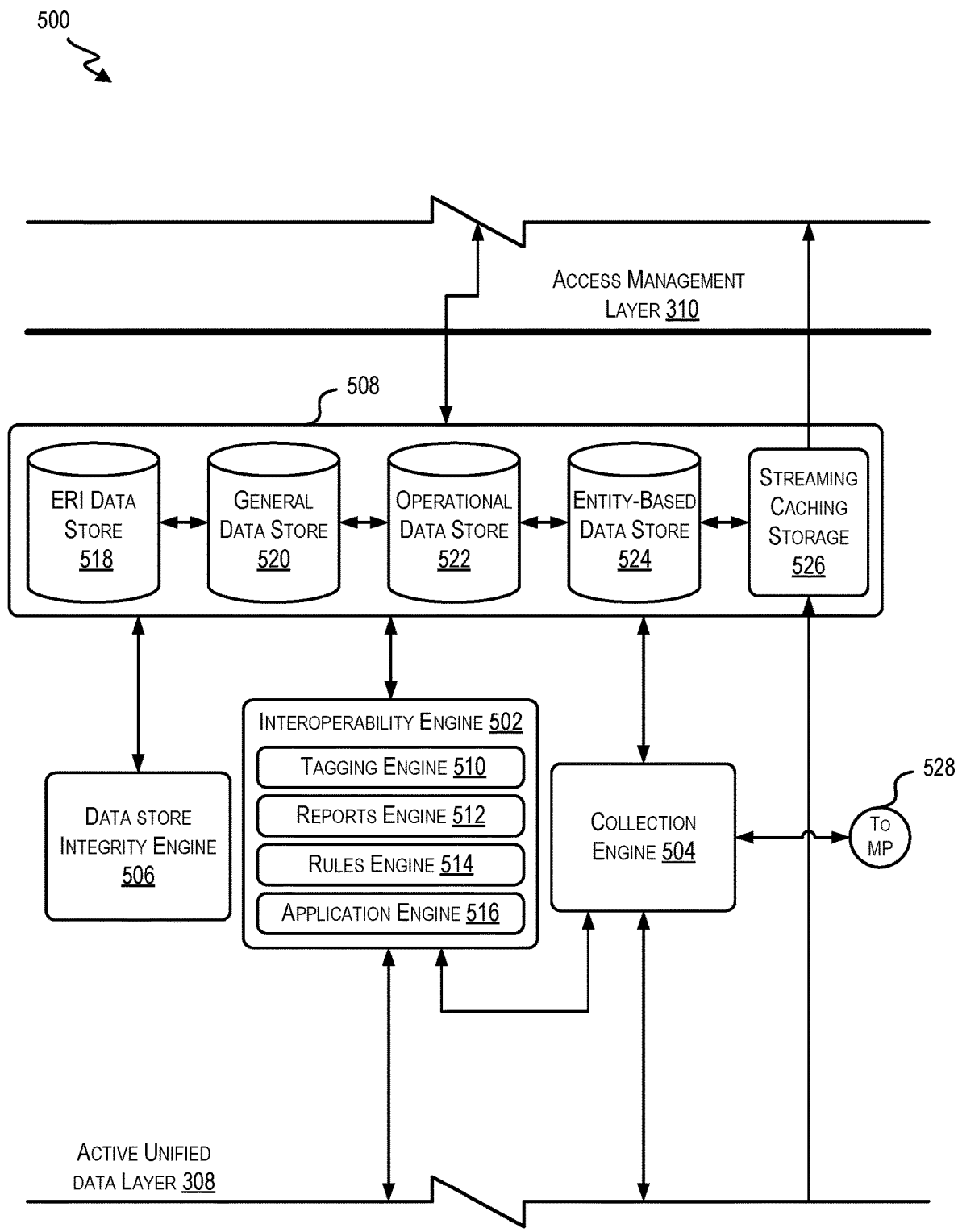
FIG. 5 is an example schematic model illustrating an aspect of the network communication model of FIG. 3 in more detail.

Referring next to FIG. 5, a diagram 500 is shown that depicts a portion of architecture stack 300 according to at least one example. In particular, diagram 500 includes active unified data layer 308 and a portion of access management layer 310. Active unified data layer 308, as illustrated in diagram 500, includes an interoperability engine 502 (e.g., interoperability engine 220), a collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), management engine 106 (e.g., collection engine 504 of management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to management engine 106 that it saw the message. In this manner, management engine 106 may track messages from end-to-end for the life of the message.

In one example, the messages are requests. The requests may be generated based om user input at one of the components. The requests may be received by transformative processing engine 108 and integrated into the system. In some examples, management engine 106 may be notified that the requests have been received and may therefore be configured to generate message IDs for each request. These message IDs may then be associated with each of the requests. As the requests continue to move throughout the interaction system (e.g., away from transformative processing engine 108), management engine 106 may track their movement using the message IDs. If one of the requests does not arrive at its destination, management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, management engine 106 (e.g., collection engine 504 of management engine 106) may receive the message and/or message identifier directly from one of components 410-418. For example, one of components 410-416 may be configured to generate the unique message identifier and/or communicate directly with management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, collection engine 504 provides unique message identifiers to other elements of the interaction system to monitor the messages as they move throughout the interaction system. Collection engine 504 also provides a portion of the unique message identifiers to a management platform (indicated by a circle 528) for further analysis of the message identifiers. Such analyses may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("ERI data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within ERI record data store 518 is retained data. In some examples, the information within ERI record data store 518 is organized according to entity identifying information. Thus, ERI record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services.

An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
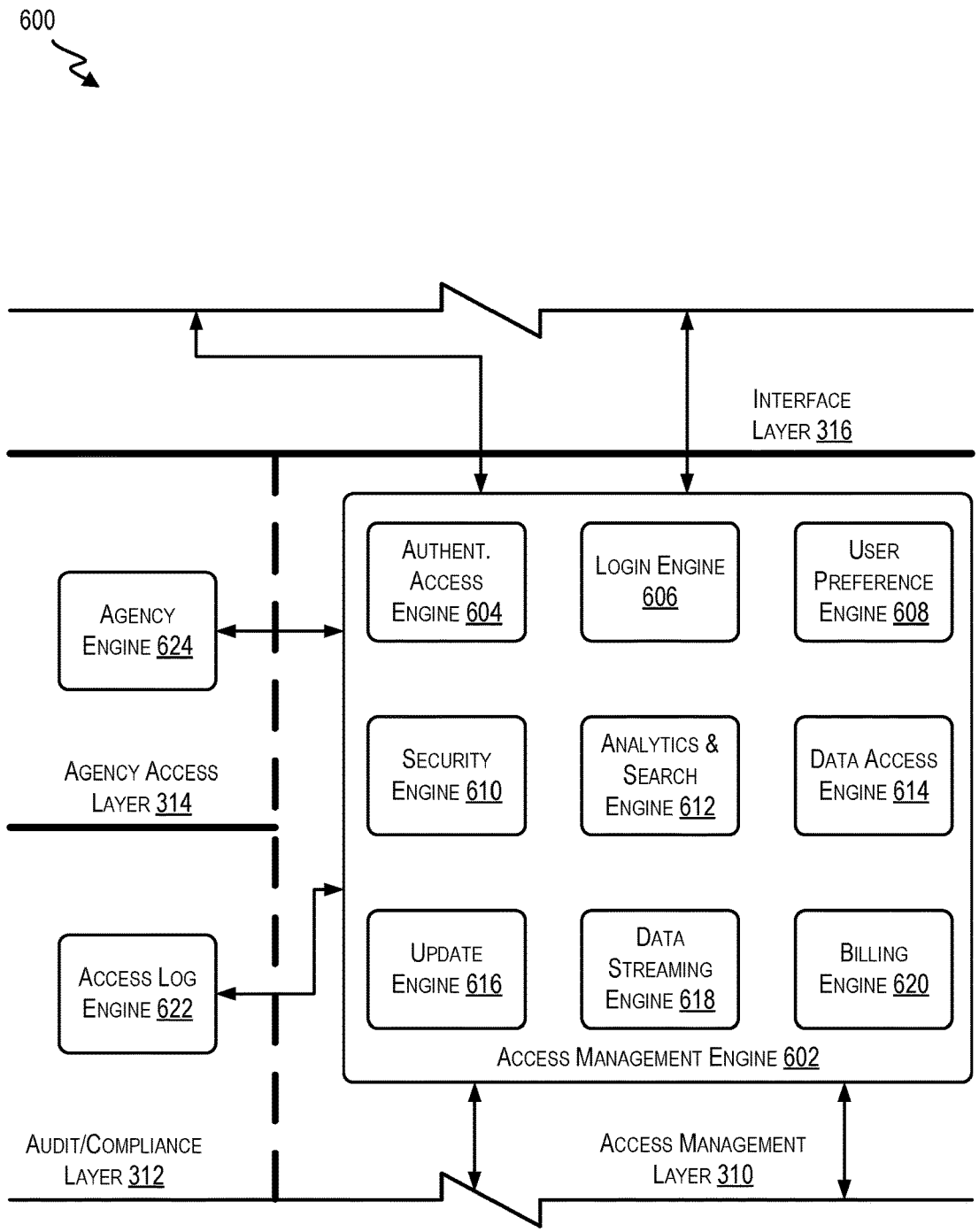
FIG. 6 is an example schematic model illustrating an aspect of the network communication model of FIG. 3 in more detail.

FIG. 6 shows a diagram 600 which depicts a portion of architecture stack 300 according to at least one example. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. In some examples, agency engine 624 may be used to track one or more performance indicators identified by a government agency and/or to provide report instances of defined types of events. In some examples, a university is an agency that uses agency engine 624 to collect data pertaining to one or more studies. Agency engine 624 can collect the pertinent data, potentially format and/or analyze the data, and facilitate transmission of the data to the appropriate agency.

Figure 7:
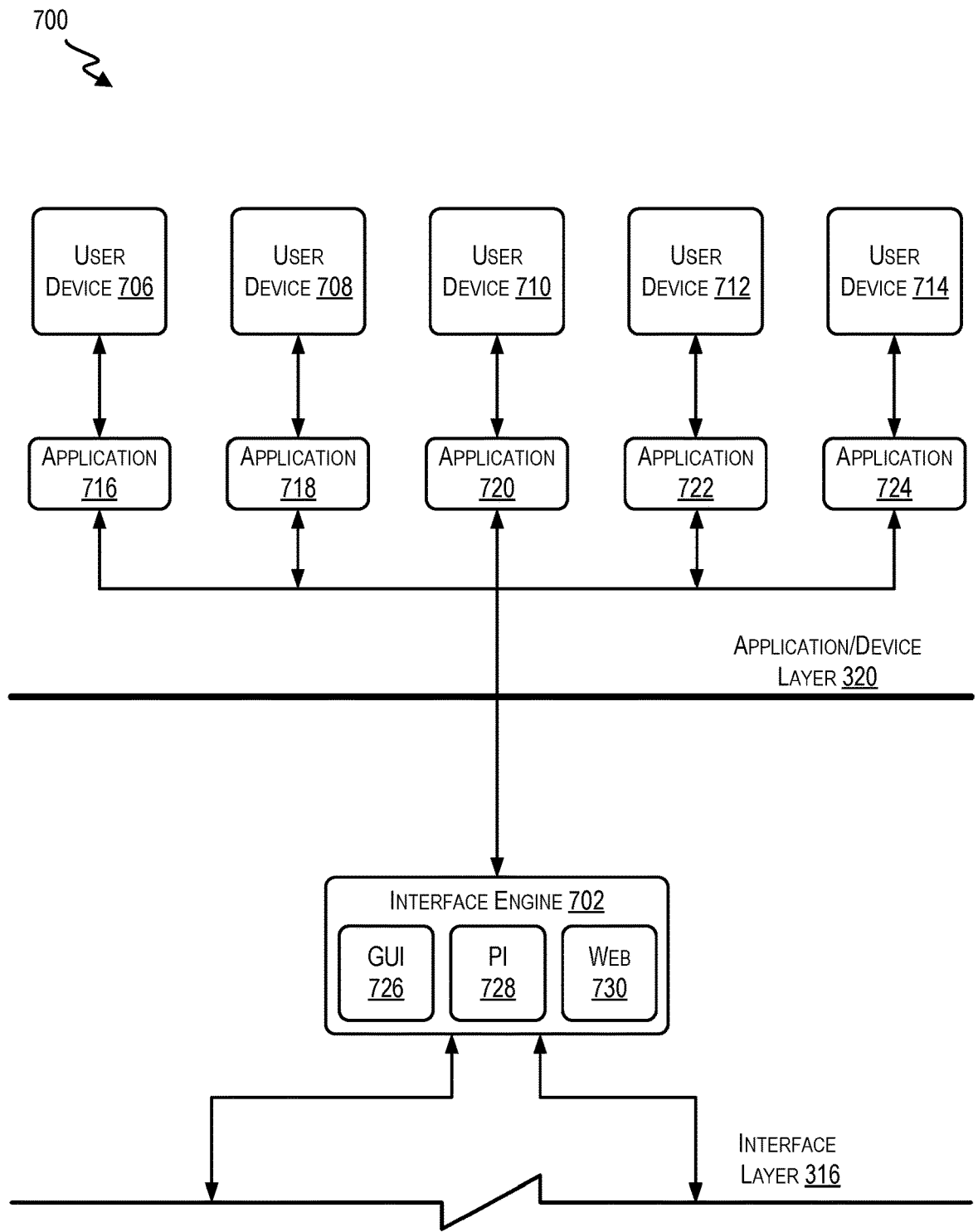
FIG. 7 is an example schematic model illustrating an aspect of the network communication model of FIG. 3 in more detail.

FIG. 7 shows a diagram 700 which depicts a portion of architecture stack 300 according to at least one example. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a focus of the entity and protected information associated with the entity. In this manner, application 720 adapts and automatically adjusts depending on the context in which the entity is using the application. Application 720 may be configured to receive input, adjust presentations, present unprompted alerts, adjust display of content, move more relevant content to the foreground, move less relevant content to the background, and/or populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
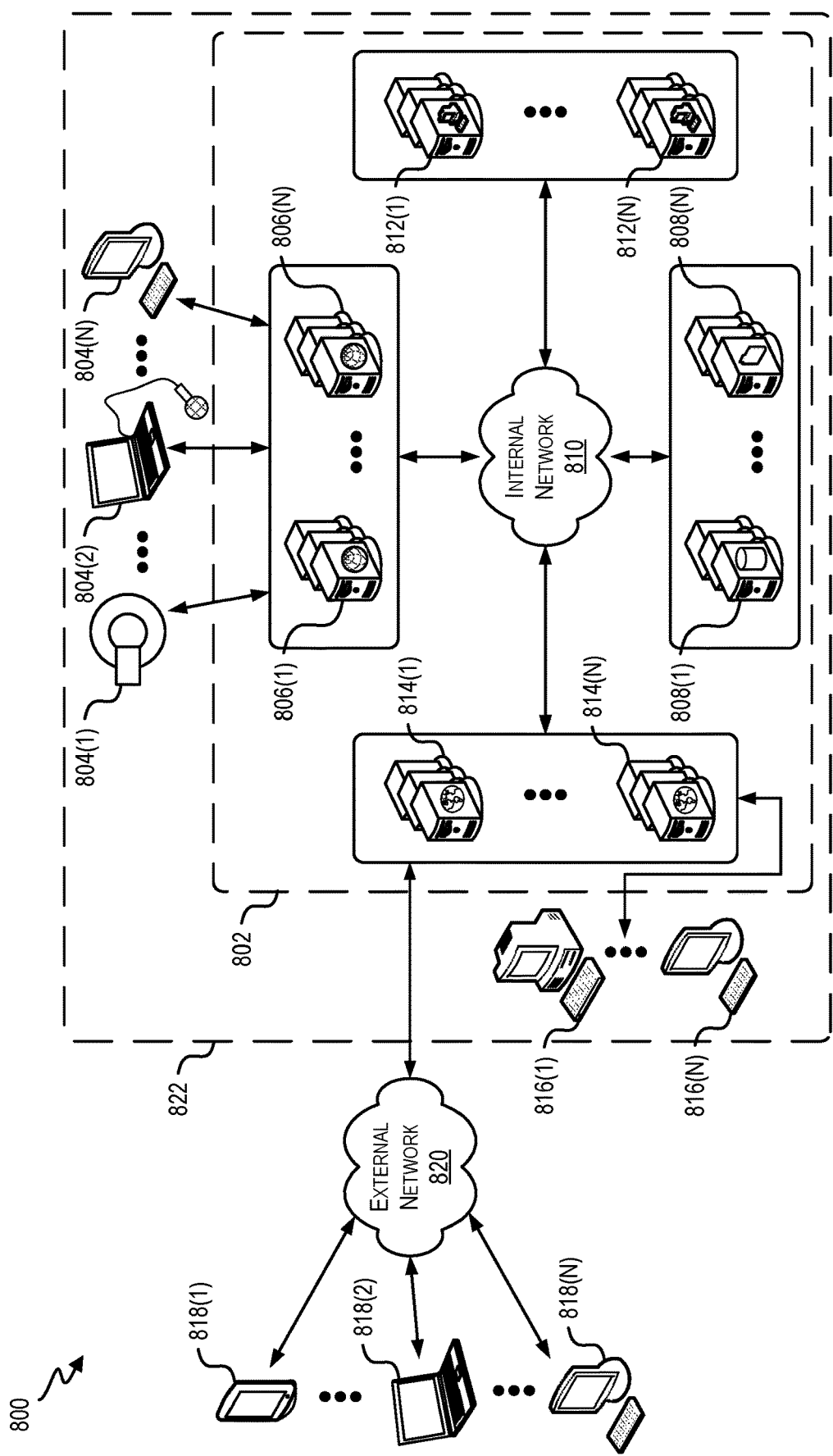
FIG. 8 is an example schematic architecture illustrating an interaction system in which techniques relating to aggregating data from disparate data sources for user interface customization may be implemented, according to at least one example.

Turning now to FIG. 8, an interaction system 800 is shown according to at least one example. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may be used to implement a particular system as described herein with reference to later figures. In one example, a computer-based method is provided for aggregating data from a multitude of disparate sources and using the data to customize a user interface. An aggregation engine may derive time record from data stored by a multitude of disparate sources including, for example, a database that stores reserved block data (e.g., scheduling data that indicates times at which users are scheduled for performing activities such as working an 8-hour shift), a database that stores activity event data (e.g., punch clock data that is associated with the users and is collected from time clocks at which the users "punch" in and out of work), and a database that stores exchange condition data (e.g., may include the types of hours that each user is qualified to work, such as productive time, second shift time, overtime, etc.). The aggregation engine predicts whether the user is on pace to meet or exceed her expected schedule (e.g., get extra compensation) and updates a user interface with this information. This enables an authorized user to adjust the reserved blocks for the users in order to avoid extra compensation. The aggregation engine also identifies instances when the users may be accruing extra time by late punches, early punches, and punches occurring in non-home departments. A notification engine takes information generated by the aggregation engine and generates and send notifications to the relevant authorized users (e.g., administrators, managers, etc.).

The techniques described herein constitute one or more technical improvements to the systems and devices on which the techniques are performed. For example, physical storage medium space is conserved because instead of multiple users exporting, downloading, and storing large files from different systems as conventionally done, the techniques described herein obtain the raw data directly from the source systems, process the data on the fly, and present it in a streamlined user interface that is accessible by the multiple users. Additionally, bandwidth resources are conserved because, unlike the conventional form of multiple users sharing via email (e.g., a first user downloading and emailing to other users), the techniques described herein obtain the raw data as described above and make it accessible via the user interface. Additionally, user time and effort of reviewing records of other users is reduced given the streamlined user interface, described herein.

Figure 9:
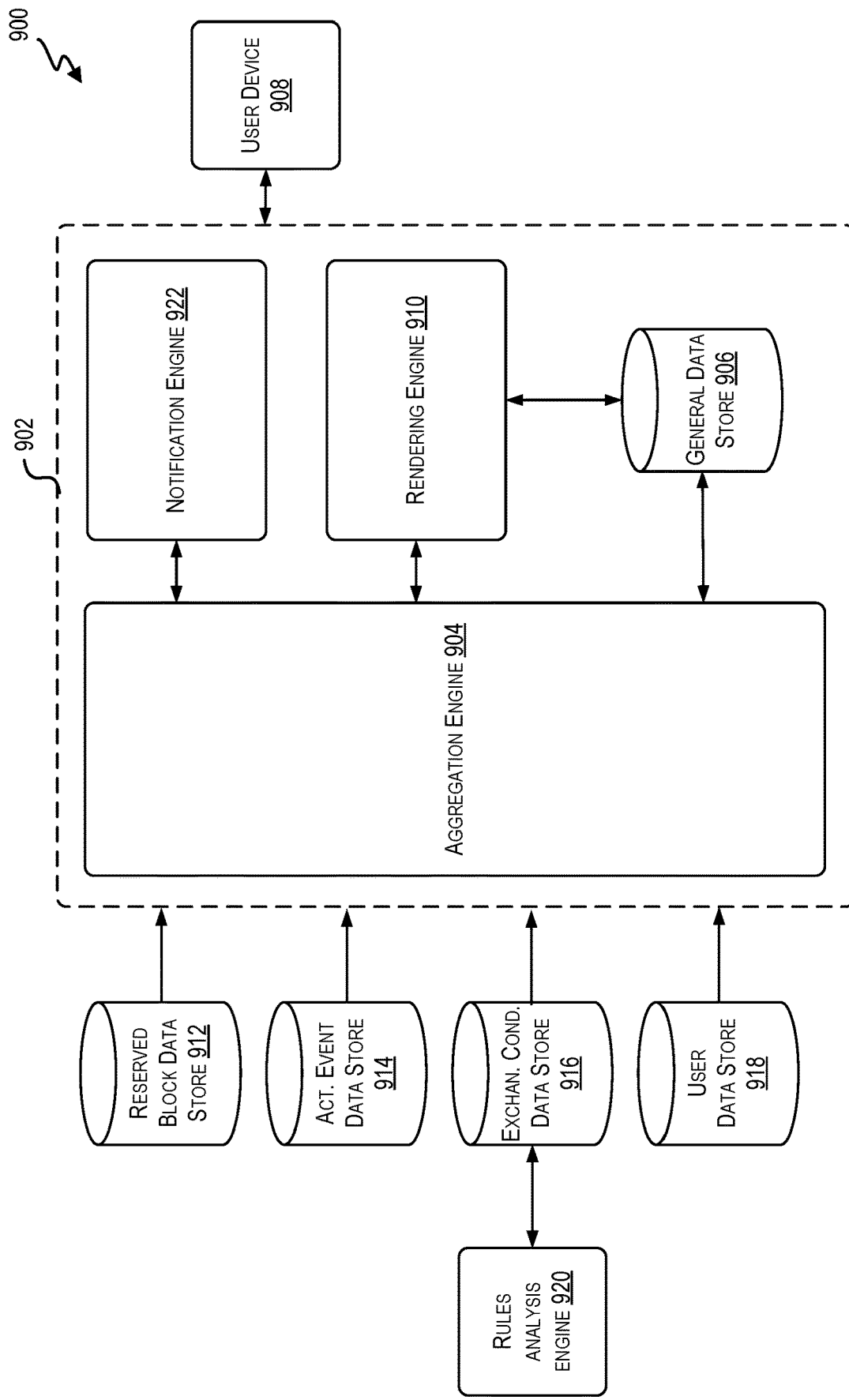
FIG. 9 is an example schematic architecture illustrating a system in which techniques relating to aggregating data from disparate data sources for user interface customization may be implemented, according to at least one example.

Referring now to FIG. 9, FIG. 9 illustrates a block diagram of an example aggregation system 900, according to at least one example. The aggregation system 900 includes a server system 902 including an aggregation engine 904 and a general datastore 906, a user device 908, a presentation engine 910, a plurality of data stores 912-918, a rules analysis engine 920, and a notification engine 922.

Generally, the aggregation engine 904 (e.g., an example of the aggregation engine 218), which may include any suitable combination of software and/or hardware, is configured to collect data from various sources and to perform one or more operations on the collected data. For example, the aggregation engine 904 may aggregate reserved block data from a reserved block data store 912, activity event data from an activity event data store 914, exchange condition data from an exchange condition data store 916, and user data from a user data store 918. The data stores 912-918 are examples of data sources and may include any suitable combination of hardware and/or software capable of storing data. In some examples, one or more of the data stores 912-918 are database. The data in the data stores 912-918 may be of any suitable type such as relational, graphical, and the like, depending on the implementation. In some examples, at least one of the data stores 912-918 may take a different form such as a remote resource, the data of which is accessed using an application programming interface.

In some examples, the reserved block data store 912 may be part of a computer system that is separate from the server system 902. For example, the reserved block data store 912 may be maintained by a computer system (or computer application) dedicated to managing reservation of time blocks. The server system 902 is able to retrieve data from the reserved block data store by virtue of a network connection between the reserved block data store 912 and the server system 902. In some examples, the server system 902 and the computer system that manages the reserved block data store are operated by the same entity.

The reserved block data store 912 stores reserved block data such as a list of users who are scheduled to work at a facility on a particular day. The reserved block data may also include the start time and the end time of each user's shift, along with the start time and the end time of any scheduled breaks, and/or the expected quantity and duration of any breaks. In addition, the reserved block data may include information regarding the times when various rooms and equipment are expected to be in use. Further, the reserved block data may include a list of the dependent users (e.g., patients) who have a scheduled event at the facility, along with a description of each dependent user's condition and scheduled procedure. In other examples, such as emergency rooms and urgent care facilities, the reserved block data may include predictions of the conditions and procedures of dependent users who are likely to arrive that day. For example, machine learning techniques may be used to analyze historical data and generate predictions based on various factors, such as day of the week, time of the day, weather conditions, traffic patterns, crime rates, etc.

In some examples, the activity event data store 914 may be part of a computer system that is separate from the server system 902. For example, the activity event data store 914 may be maintained by a computer system (or computer application) dedicated to collecting, sorting, and storing activity events. The server system 902 is able to retrieve data from the activity event data store 914 by virtue of a network connection between the activity event data store 914 and the server system 902. In some examples, one entity may operate the server system 902 and the computer system that manages the activity event data store 914.

The activity event data store 914 stores activity event data such as records of time card punches made at various punch clocks within an organization. The punch clocks may be manual or electronic, and the punch clock data may indicate which punch clock was used for each time card punch. In other examples, the activity event data may include records of when a user entered or left an area based on wireless transmissions from an application on the user's smartphone, badge, etc. Any suitable wireless communication technology may be used, such as WiMAX, WiFi, radio, cellular networks, etc.

In some examples, the exchange condition data store 916 may be part of a computer system that is separate from the server system 902. For example, the exchange condition data store 912 may be maintained by a computer system (or computer application) dedicated to managing exchange conditions. The server system 902 is able to retrieve data from the exchange condition data store 916 by virtue of a network connection between the exchange condition data store 916 and the server system 902. In some examples, one entity operates the server system 902 and the computer system that manages the exchange condition data store 916. In some examples, a first entity may operate the server system 902 and the computer system that manages the reserved block data store 912 and a second entity may operate the activity event data store 914 and the exchange condition data store 916.

The exchange condition data store 916 may store exchange condition data such as the types of hours that each user is qualified to work, such as productive time, second shift time, overtime, etc. The exchange condition data may also include information about how to compensate each user for each time block that the user works. For example, a normal shift may be paid at an agreed rate, but if the user works longer, the user may be paid at 1.5 times the agreed rate. The exchange condition data may be determined by a rule analysis engine 920. The rules analysis engine 920 evaluates the exchange condition data and determines whether changes should be made. The rules analysis engine 920 also provides a user interface for a user to input changes to the exchange condition data.

In some examples, the user data store 918 may be part of a computer system that is separate from the server system 902. For example, the user data store 918 may be maintained by a computer system (or computer application) dedicated to managing user data. The server system 902 is able to retrieve data from the user data store 918 by virtue of a network connection between the user data store 918 and the server system 902. In some examples, one entity operates the server system 902 and the computer system that manages the user data store 918. In some examples, a first entity may operate the server system 902 and the computer system that manages the reserved block data store 912 and that manages the user data store 918, and a second entity may operate the activity event data store 914 and the exchange condition data store 916.

The user data in the user data store 918 may include various information about each user, such as the user's general qualifications and any specific tasks that the user is qualified to perform. For example, the user data may indicate which equipment an user is qualified to operate and which procedures the user is qualified to perform. In some examples, the user data may be used to store user profiles for each of the users. The user profiles may identify characteristics, qualifications, certifications, demographics, and any other suitable contextual information. In some examples, each user profile may include a user identifier that uniquely identifies the user.

The reserved block data, activity event data, exchange condition data, and user data may be updated periodically, such as every minute, every thirty minutes, every hour, every two hours, every four hours, daily, weekly, or monthly. Further, the reserved block data, activity event data, exchange condition data, and user data may be sent to the aggregation engine 904 periodically, such as every minute, every thirty minutes, every hour, every two hours, every four hours, daily, weekly, or monthly. In some examples, the server system 902 is able to output notifications and/or provide new data to a rendered user interface every 15 minutes. This may mean that the aggregation engine 904 collects new data from at least some of the data stores 912-918 as often as every 15 minutes.

The aggregation engine 904 may aggregate some or all of the data. The aggregation engine 904 may include various engines for aggregating the data. After aggregating the data, the aggregation engine 904 may send the results to a general data store 906, which is configured to store the results. Further, the aggregation engine 904 may output the results to the notification engine 922 and/or the rendering engine 910. The notification engine 922 is configured to generate notifications regarding output from the aggregation engine 904. Such notifications may include anomaly events identified by the aggregation engine 904. The notifications may be provided to the user device 908 for consumption. In some examples, when the results are provided to the rendering engine 910, the rendering engine 910 may generate a user interface that includes the results, as described with respect to FIGS. 12-17.

Figure 10:
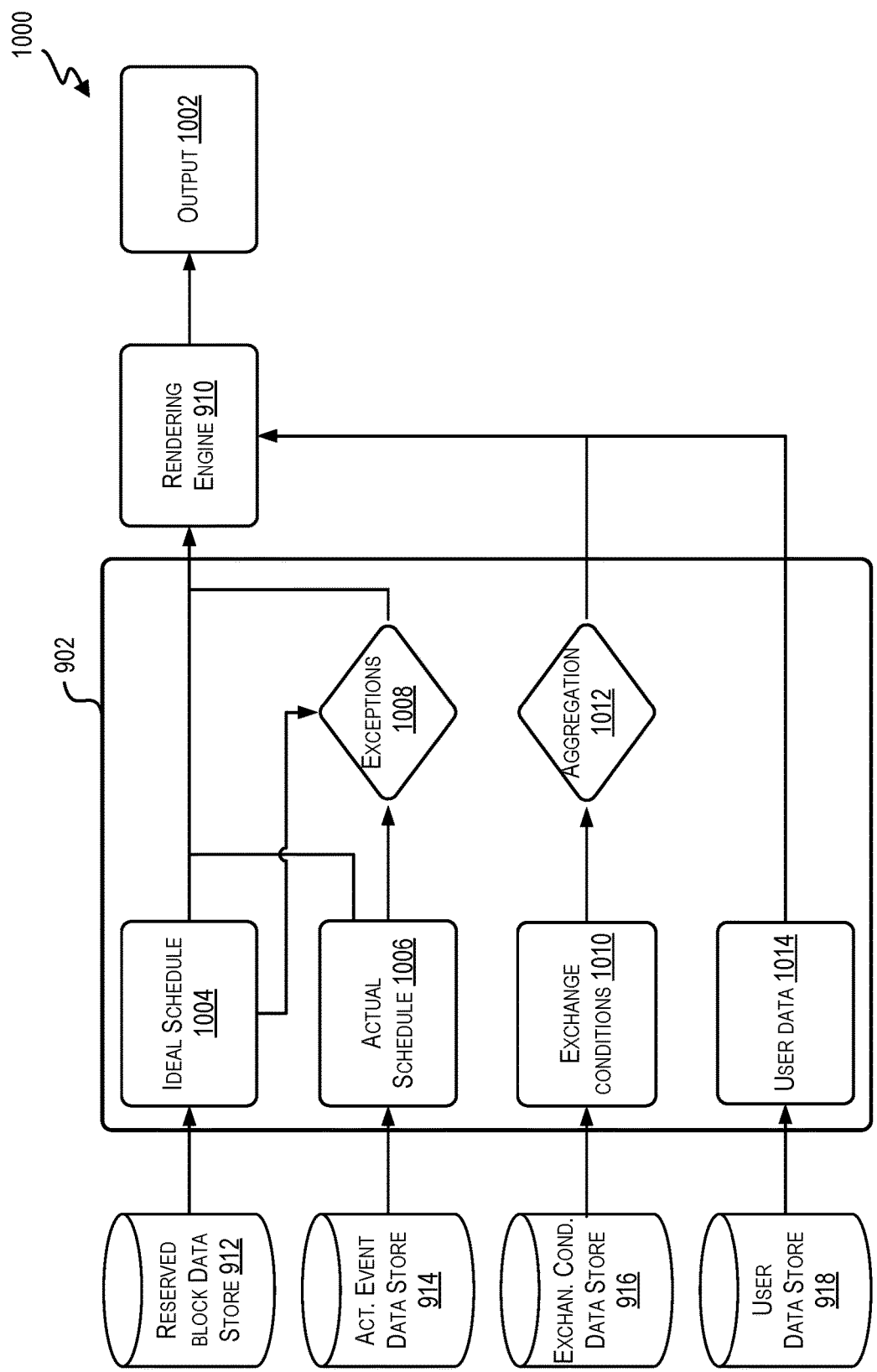
FIG. 10 is an example diagram illustrating an aspect of a system in which techniques relating to aggregating data from disparate data sources for user interface customization may be implemented, according to at least one example.

FIG. 10 is an example diagram illustrating an aspect of a system 1000 in which techniques relating to aggregating data from disparate data sources for user interface customization may be implemented, according to at least one example. The system 1000 includes components from the system 900 such as the data stores 912-918, the aggregation engine 902 and the rendering engine 910. The system 1000 in particular is used to determine a proactive holistic view of the time data.

Generally, the system 1000 depicts a flow of data from the data stores 912-918 to the aggregation engine 902, and from the aggregation engine 902 to the rendering engine 910, which generates an output 1002. The aggregation engine 902 begins by determining an ideal schedule 1004 using data received from the reserved block data store 912. The ideal schedule 1004 may indicate reserved blocks of time for a user within some time period (e.g., a day, a week, a month, etc.). An ideal schedule 1004 may be determined for each user of the system, i.e., on a user-by-user basis. In some examples, the ideal schedule 1004 is generated by a different system and stored by the reserved block data store 912 and accessed by the aggregation engine 902. The rendering engine 910 receives the ideal schedule 1004 and renders a timeline that identifies the scheduled, i.e., reserved blocks as the output 1002. In some examples, the timeline may be 35 hours and/or otherwise correspond to the period defined above.

The aggregation engine 902 also determines an actual schedule 1006 using data received from the activity event data store 914. The data received from the activity event data store 914 may include a record of activity events that identify a user and a location and/or device at which the activity event was recorded, along with a timestamp. The aggregation engine 904 uses this data to determine the actual schedule 1006 on a user-by-user basis, i.e., for each user in the system 1000. The actual schedule 1006 is an accurate reflection of when the user was performing the activities, i.e., when the user punched in and punched out during some predefined period. The actual schedule 1006 may correspond to some time period (e.g., a day, a week, a month, etc.). In some examples, the actual schedule 1006 is generated by a different system and stored by the activity event data store 914 and accessed by the aggregation engine 902. The rendering engine 910 receives the actual schedule 1006 and renders user interface elements that include a timeline that identifies the actual blocks, i.e., blocks bounded by two activity events (e.g., a punch in and a punch out) as the output 1002. In some examples, the timeline may be 35 hours and/or otherwise correspond to the period defined above.

The aggregation engine 902 uses the ideal schedule 1004 and the actual schedule 1006 to compute exceptions 1008. The exceptions 1008 identify instances when the actual schedule 1006 is different from the ideal schedule 1004. Thus, the exceptions 1008 may include many different circumstances such as when the actual schedule 1006 includes actual blocks that were not approved (i.e., not reflected on the ideal schedule 1004), that were late or early with respect to the reserved blocks in the ideal schedule 1004, that overlap with other time, that were collected in a non-home department, etc. The exceptions 1008 are shared with the rendering engine 910, which renders user interface elements that represent the exceptions 1008, as illustrated in later figures. The rendering engine 910 provides the user interface elements 910 as the output 1002.

The aggregation engine 902 also determines exchange conditions 1010 by accessing exchange condition data from the exchange condition data store 916. In some examples, the computer system that manages the exchange condition data store 916 and/or the rules analysis engine 920 determines the exchange conditions 1010 and stores them in the exchange condition data store 916. The exchange conditions 1010 are then aggregated at 1012 by the aggregation engine 902 and shared with the rendering engine 910. The aggregated exchange conditions may include organizing the exchange conditions 1010 by group and calculating a group start offset and width of user interface elements used to represent the exchange conditions 1010 in the output 1002.

The aggregation engine 902 also access the user data 1014 from the user data store 908 and shares the user data 1014 with the rendering engine 910. In some examples, the ideal schedule 1004, the actual schedule 1006, and the exchange conditions 1010 may be associated with a user profile record of a user stored in the user data store 918 and represented by the user data 1014. This may enable the rendering engine 910 to display the correct data in connection with the correct user.

Figure 11:
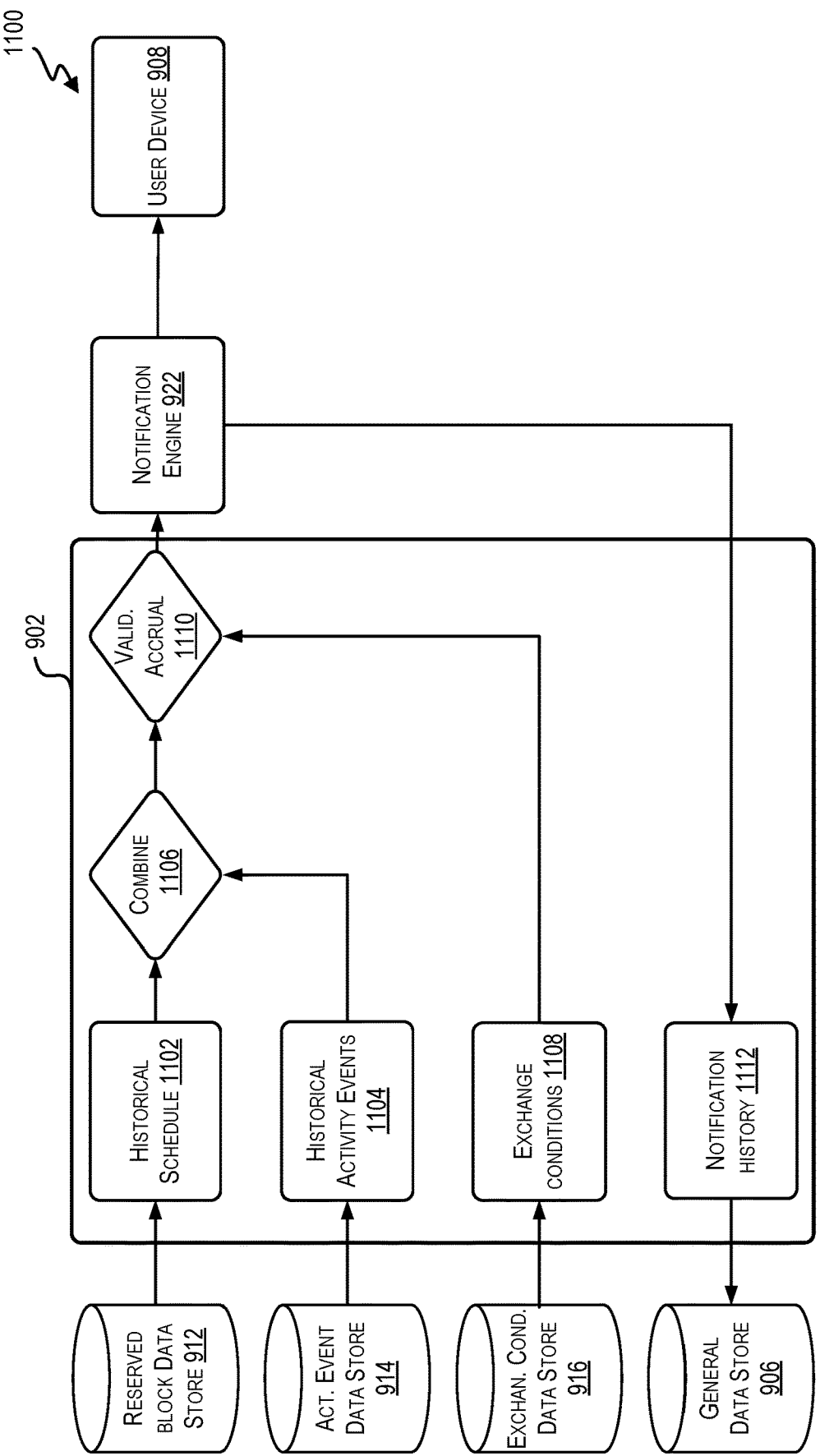
FIG. 11 is an example diagram illustrating an aspect of a system in which techniques relating to aggregating data from disparate data sources for user interface customization may be implemented, according to at least one example.

FIG. 11 is an example diagram illustrating an aspect of a system 1100 in which techniques relating to aggregating data from disparate data sources for user interface customization may be implemented, according to at least one example. The system 1100 includes components from the system 900 such as the data stores 912-918, the aggregation engine 902, the notification engine 922, and the user device 908. The system 1100 in particular is used to analyze the data of the system to determine incremental increases in the user's actual time. The incremental increases may be characterized in minutes such as incremental 15 minutes, incremental 30 minutes, incremental 45 minutes, etc.

Generally, the system 1100 depicts a flow of data from the data stores 912-918 to the aggregation engine 902, and from the aggregation engine 902 to the notification engine 922, which sends notifications to the user device 908. The aggregation engine 902 begins by determining a historical schedule 1102 using data received from the reserved block data store 912. The historical schedule 1102 may include reserved blocks in the past, which is based on the ideal schedule 1004. In some examples, the aggregation engine 902 may access the historical schedule 1102 directly from the reserved block data store 912.

The aggregation engine 902 also determines historical activity events 1104 using data received from the activity event data store 914. The historical activity events 1104 may include actual blocks that occurred in the past, which is based on the actual schedule 1006. In some examples, the aggregation engine 902 may access the historical activity events 1104 directly from the activity event data store 914.

The aggregation engine 902 then, at 1106, combines the historical schedule 1102 and the historical activity events 1104. This may include comparing the historical schedule 1102 and the historical activity events 1104 to determine any discrepancies.

The aggregation engine 902 also determines exchange conditions 1108 using data received form the exchange condition data store 916. The exchange conditions 1108 are an example of the exchange conditions 1010.

The aggregation engine 902 then, at 1110, validates accrual of the blocks represented by the combination of the historical schedule 1102 and the historical activity events 1104, and the exchange conditions 1108. Validating the accrual may include rounding times in the historical activity events 1104, which represent an actual schedule, and subtracting the historical schedule 1102, which represents an ideal schedule, from the rounded times. Depending on the difference, the notification engine 922 may generate different notifications which may be sent to different user devices 908. The notification engine 922 also shares a notification history 1112 regarding what notifications it generated with the aggregation engine 902 to send back to the general data store 906. In this manner, a record of notifications is stored in the general data store 906.

Similar to the discussion above of determining accrual of blocks, the system 1100 may be used to determine accrual of overtime. This may be used to determine whether, given a set of actual blocks represented by the historical activity events 1104 and a set of reserved blocks represented by the historical schedule 1102, a user is at risk of exceeding some predefined value represented as a threshold or value (e.g., a threshold number of hours resulting in a different arrangement). In some examples, there may be a set of thresholds relating to a given major threshold (e.g., 40 hours). For example, a first threshold may be 40 hours (e.g., the same as the major threshold), indicating that a user is already exceeded the major threshold. A second threshold may be more than 32 hours, indicating that a user is at risk of exceeding the major threshold. A third threshold may be less than 32 hours, indicating that a user is not at risk of exceeding the major threshold. This process may be run towards the end of a given period (e.g., week). In some examples, the thresholds can be adjusted and the process associated with the system 1100 can be executed daily.

Figure 12:
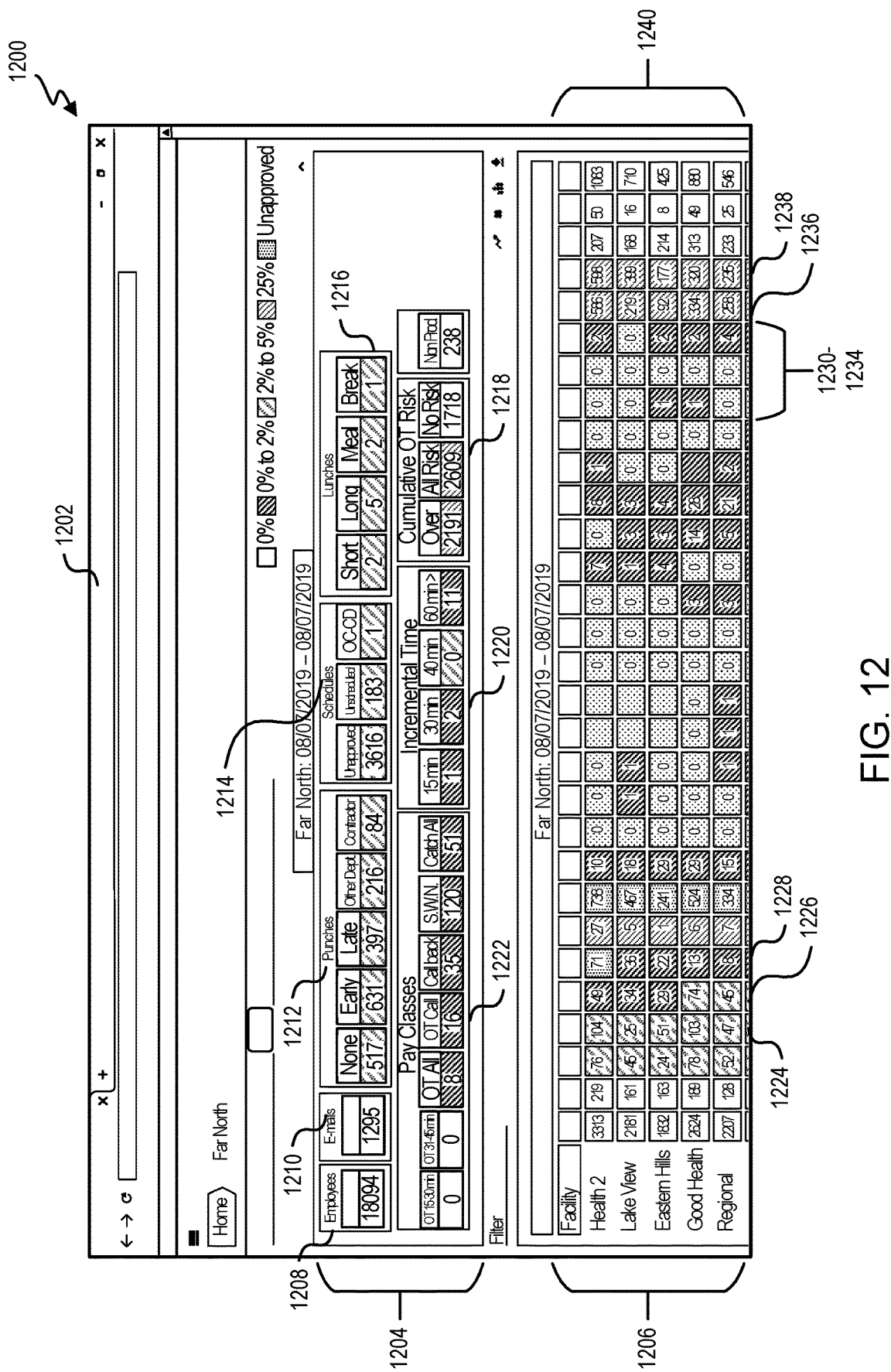
FIG. 12 is an example diagram illustrating a user interface that has been customized with data aggregated from disparate sources, according to at least one example.

FIG. 12 is an example diagram illustrating a user interface 1200 that has been customized with data aggregated from disparate sources, according to at least one example. The user interface 1200 is depicted in a web browser 1202 on a display device. The user interface 1200 in particular depicts data for an entire region, "Far North." The user interface 1200 includes a data section 1204, a facility section 1206 that identifies facilities, and a filtered data section 1240.

The data section 1204 include a plurality of sub-sections 1208-1222, each of which includes at least one box including the number of records corresponding to a section definition. At least some of the data in the sub-sections 1208-1222 is computed by the aggregation engine 902, while at least some of the data is pulled directly from the data stores 912-918. The sub-section 1208 represents a total number of users in the region. The sub-section 1210 represents a total number of email notifications sent within the region. These email notifications may relate to those sent by the notification engine 922 of the system 902.

The sub-section 1212 represents activity event data, at least some of which has been processed by the aggregation engine 902 using the techniques described herein. In particular, the sub-section 1212 includes instances when users do not record activity events, record activity events early, record activity events late, record activity events in a non-home department, and/or are contract users.

The sub-section 1214 represents reserved block data, at least some of which has been processed by the aggregation engine 902 using the techniques described herein. In particular, the sub-section 1214 includes the number of approved reserved blocks, the number of unscheduled, and the number of users that transferred from on-call to on the clock.

The sub-section 1216 represents output that has been processed by the aggregation engine 902 using the techniques described herein. In particular, the sub-section 1216 includes the number of short and long lunches, meals, and breaks that are exceptions.

The sub-section 1218 represents output that has been processed by the aggregation engine 902 using the techniques described herein. In particular, the sub-section 1218 includes the number of users whose hours have already exceeded a major threshold for a given period, at risk of exceeding the major threshold for the given period, or are not at risk of exceeding the major threshold.

The sub-section 1220 represents output that has been processed by the aggregation engine 902 using the techniques described herein. In particular, the sub-section 1220 includes incremental time that has been captured by the users.

The sub-section 1222 represents exchange condition data, at least some of which has been processed by the aggregation engine 902 using the techniques described herein. In particular, the sub-section 1222 includes different exchange classes of users.

Generally, the filtered data section 1240 includes the same data represented by the data section 1204, but organized/filtered by facility. In some examples, each column in the filtered data section 1240 may correspond to one of the definitions associated with the boxes in the data section 1204. For example, the column 1224 may correspond the number of early activity events represented by sub-section

1212. The column 1226 may correspond to the number of late activity events represented by the sub-section 1212. The column 1228 may correspond to the number of activity events (and/or users) that recorded activity events in a non-home department. The columns 1230-1234 may correspond to incremental time represented by the sub-section 1220. The column 1236 may correspond to users that have already exceeded the major threshold, as represented by the sub-section 1218. Similarly, the column 1238 may correspond to users that are at risk of exceeding the major threshold, as represented by the sub-section 1218.

Any of the boxes in the data section 1204, the filtered data section 1240, and/or the facility section 1206 is selectable and may enable further drilling down into the underlying data. Similarly, selection of any of the facilities may enable drilling down to a facility level.

Figure 13:
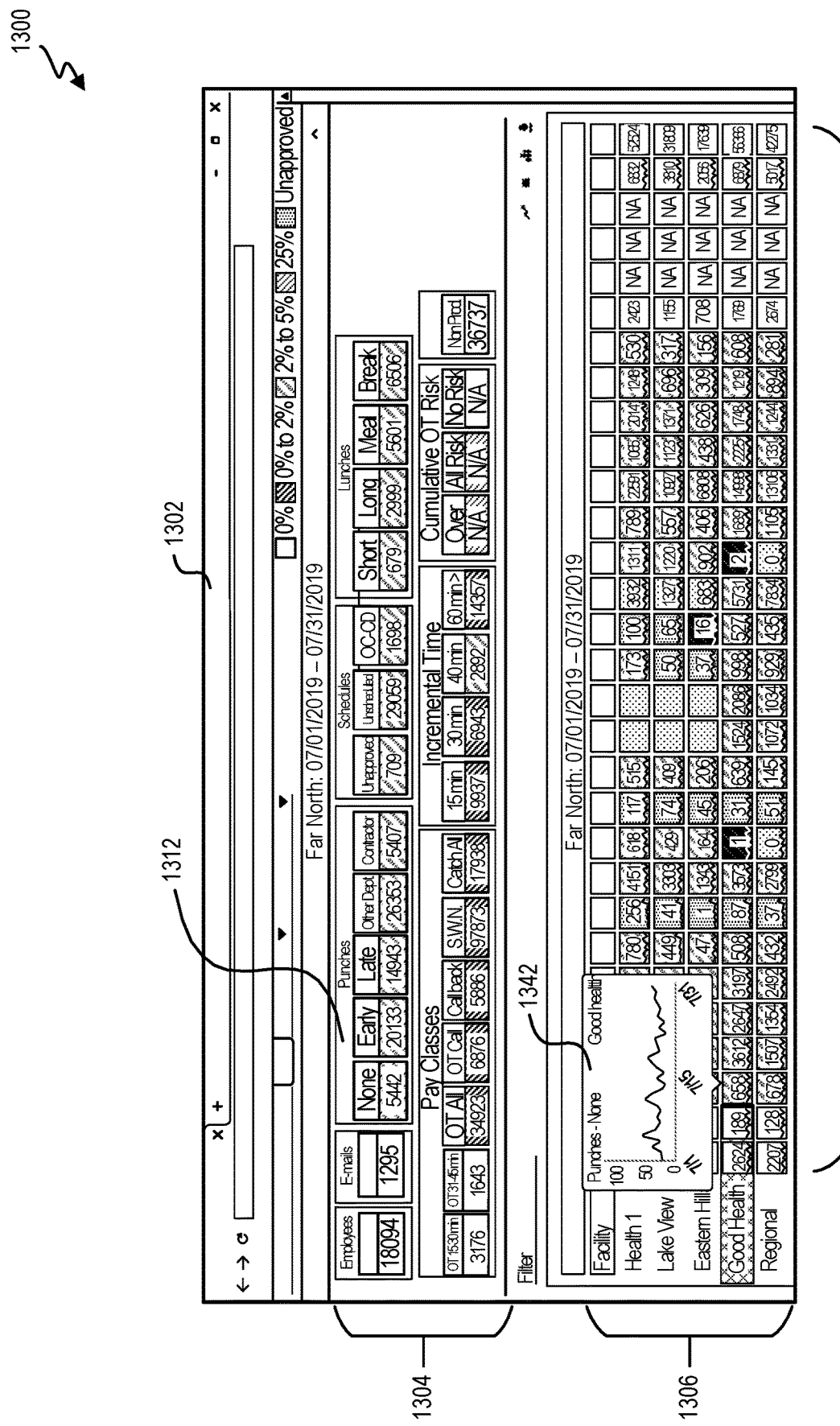
FIG. 13 is an example diagram illustrating a user interface that has been customized with data aggregated from disparate sources, according to at least one example.

FIG. 13 is an example diagram illustrating a user interface 1300 that has been customized with data aggregated from disparate sources, according to at least one example. The user interface 1300, which is an example of the user interface 1200, is depicted in a web browser 1302 on a display device. The user interface 1300 in particular depicts data for an entire region, "Far North" over a full month. Like the user interface 1200, the user interface 1300 includes a data section 1304, a facility section 1306 that identifies facilities, and a filtered data section 1340.

As may be apparent, because of the full month time period, the number of records in the data section 1304 and the filtered data section 1340 is much larger than illustrated in FIG. 12. Because of the additional data, the aggregation engine 902 is able to determine and display trending data (e.g., a miniaturized but technically accurate graph) in connection with each of the totals in the boxes in the filtered data section 1340. When hovering over one of the boxes, the trending data may be presented in a popup window 1342. In this example, the trending data may be a graph of the underlying data associated with the particular cell, i.e., at the "Good Health" facility and "none" in the activity from the sub-section 1312. The trending data is trending data at a facility level.

Figure 14:
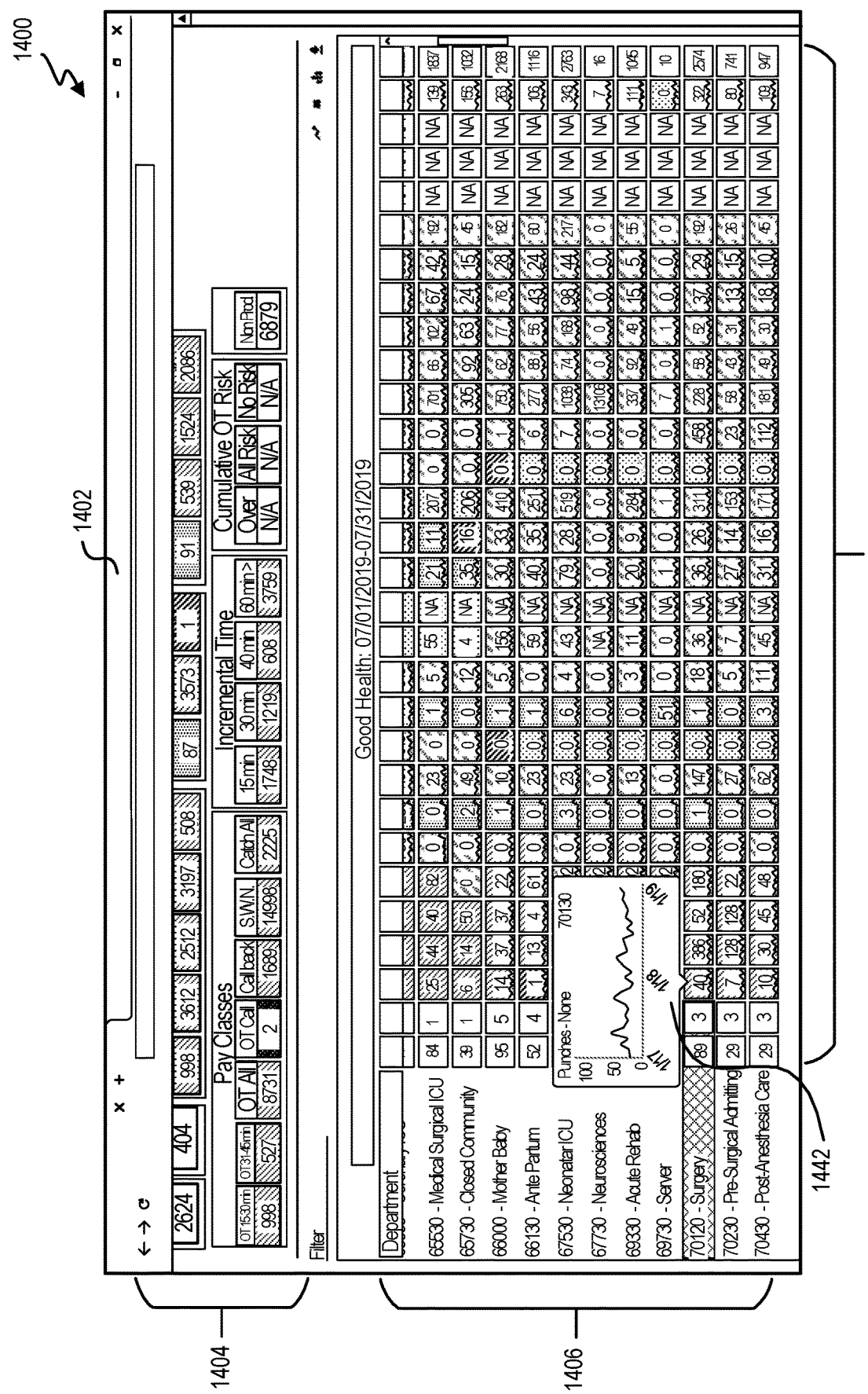
FIG. 14 is an example diagram illustrating a user interface that has been customized with data aggregated from disparate sources, according to at least one example.

FIG. 14 is an example diagram illustrating a user interface 1400 that has been customized with data aggregated from disparate sources, according to at least one example. The user interface 1400, which is an example of the user interface 1300, is depicted in a web browser 1402 on a display device. The user interface 1400 in particular depicts data for an entire facility, "Good Health" over a full month. For example, a user may have selected the "Good Health" facility from the list in the department section 1406. Like the user interface 1300, the user interface 1400 includes a data section 1404, a department section 1406 that identifies departments, and a filtered data section 1440.

As may be apparent, because of the full month time period, the number of records in the data section 1404 and the filtered data section 1440 is much larger than illustrated in FIG. 12, but because the data is limited to one facility, the number of records is smaller than illustrated in FIG. 13. Because of the additional data, the aggregation engine 902 is able to determine and display trending data in connection with each of the totals in the boxes in the filtered data section 1440. The trending data in all of the boxes represents trends at a facility level. When hovering over one of the boxes, the trending data may be presented in a popup window 1442. The trending data is a graph of the underlying data associated with the particular cell.

Figure 15:
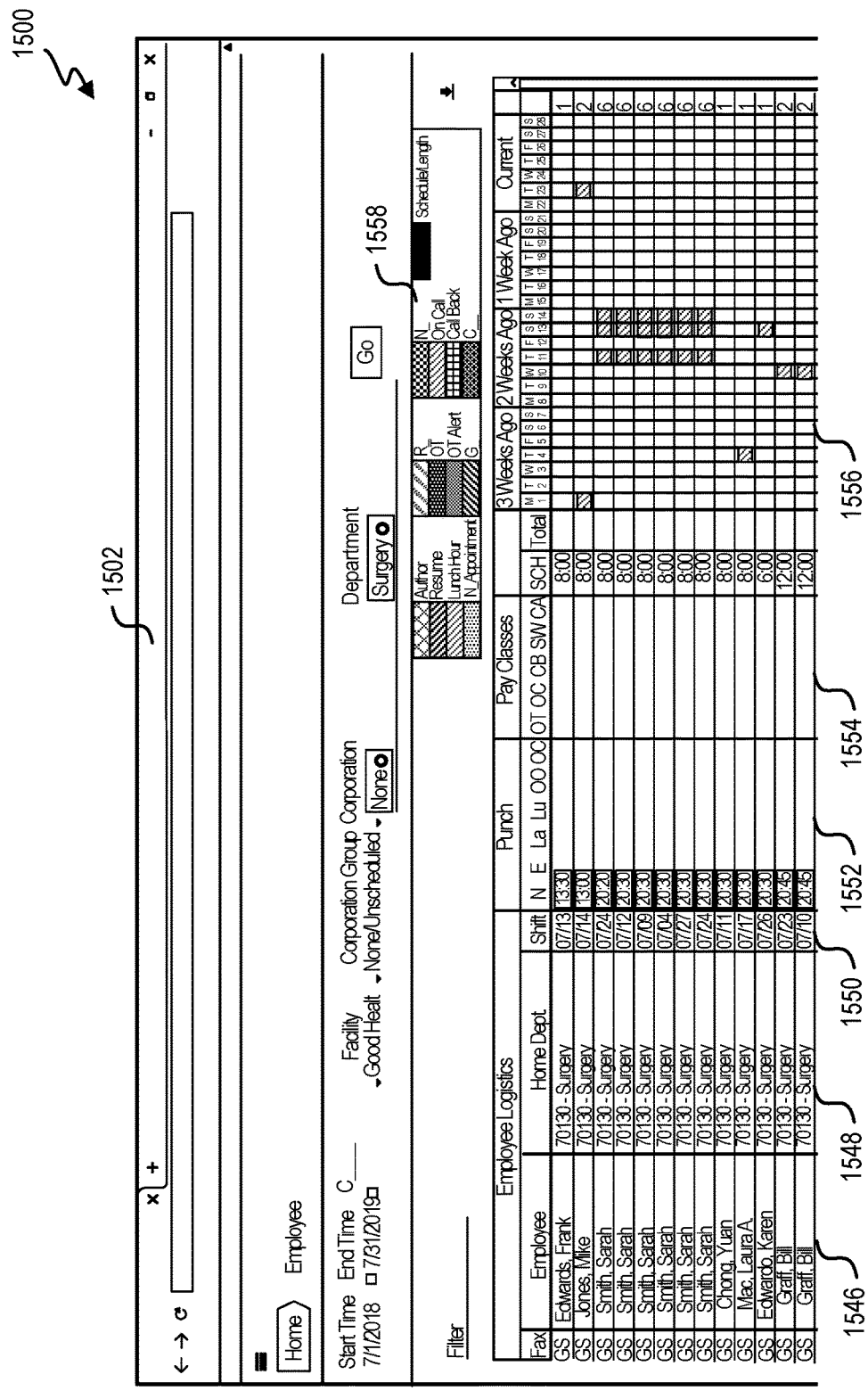
FIG. 15 is an example diagram illustrating a user interface that has been customized with data aggregated from disparate sources, according to at least one example.

FIG. 15 is an example diagram illustrating a user interface 1500 that has been customized with data aggregated from disparate sources, according to at least one example. The user interface 1500, which is an example of the user interface 1400, is depicted in a web browser 1502 on a display device. The user interface 1500 in particular depicts data for a particular department over a full month. For example, a user may have selected the "surgery" department from the list in the department section 1406. The user interface 1500 includes a list of users 1546, a home department list 1548, a shift list 1550, an activity event list 1552, an exchange condition list 1554, and an indicator area 1556. In the indicator area 1556 is presented user interface elements corresponding to a legend 1558. The user interface elements of the user interface 1500 correspond to different computed values and derived values from the one or more data sources such as the data stores 912-918.

Figure 16:
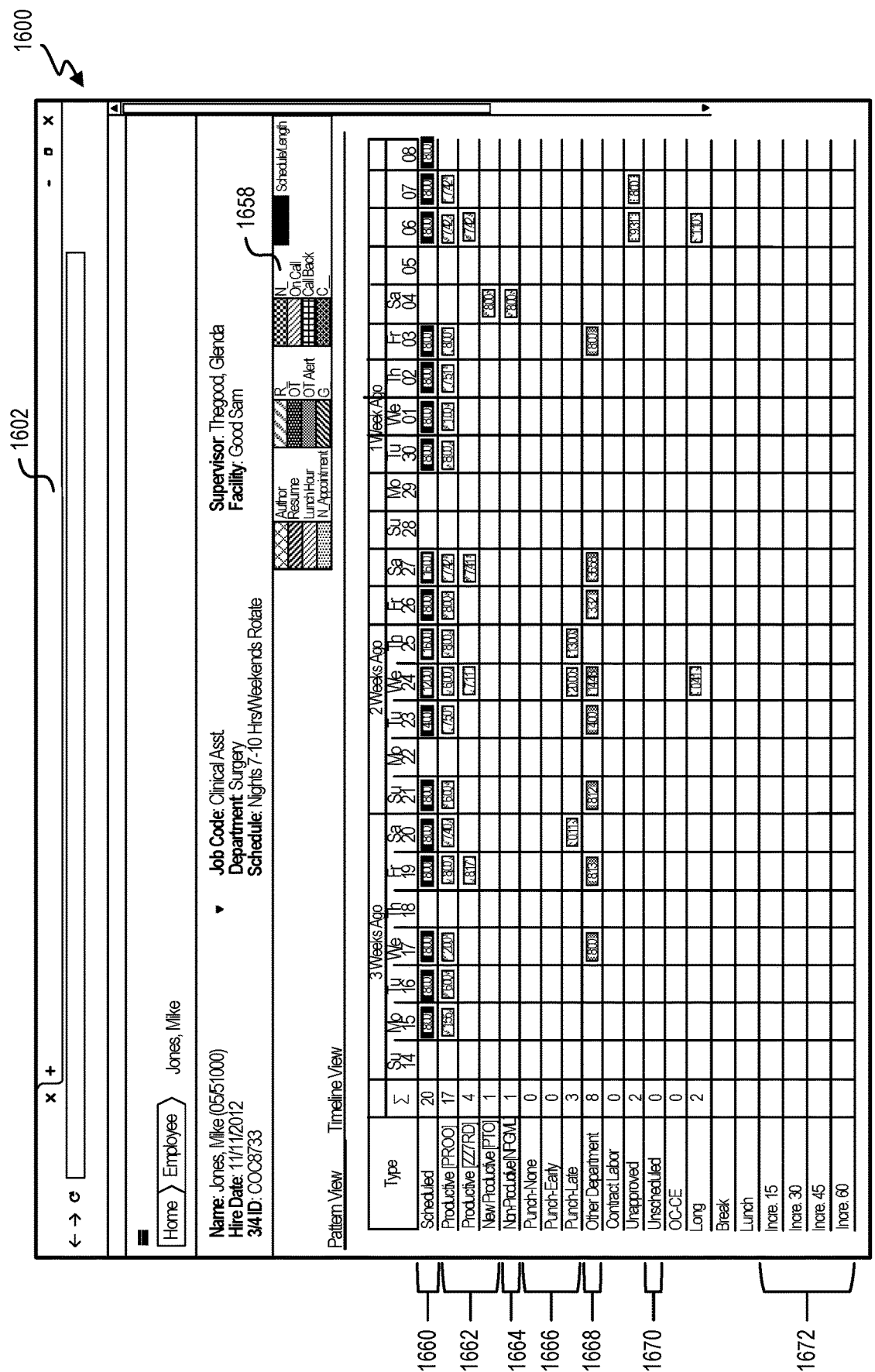
FIG. 16 is an example diagram illustrating a user interface that has been customized with data aggregated from disparate sources, according to at least one example.

FIG. 16 is an example diagram illustrating a user interface 1600 that has been customized with data aggregated from disparate sources, according to at least one example. The user interface 1600, which is an example of the user interface 1500, is depicted in a web browser 1602 on a display device. The user interface 1600 in particular depicts data for a particular user over a full month. For example, a user may have selected the "Jones, Mike" from the user list 1546 in the user interface 1500.

The user interface 1600 includes various types of indicators, which can be used to display patterns of the particular user. The types include, for example, a scheduled type 1660, a productive types 1662, non-productive type 1664, activity event types 1666, department type 1668, unscheduled type 1670, and incremental types 1672. The user interface 1600 also includes a legend 1658. The legend 1658 represents the types of indicators that can be displayed in the table portion of the user interface 1600. The types of indicators have been described with references to other figures. These indicators are highlighted at this time to point out that the same indicators can be used to monitor patterns at many levels of granularity.

Figure 17:
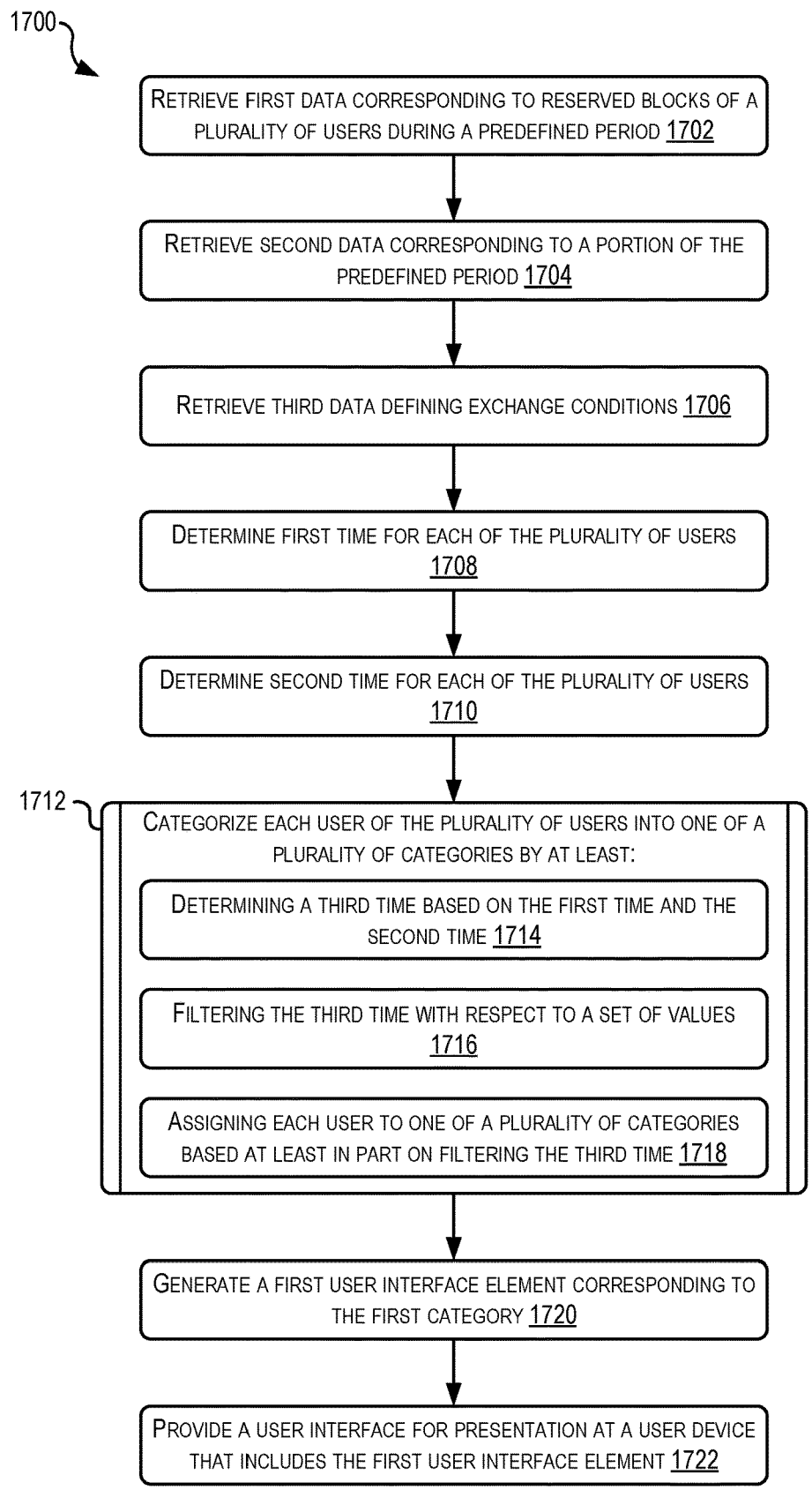
FIG. 17 is an example flowchart illustrating a process for aggregating data from disparate data sources for user interface customization, according to at least one example.
Figure 18:
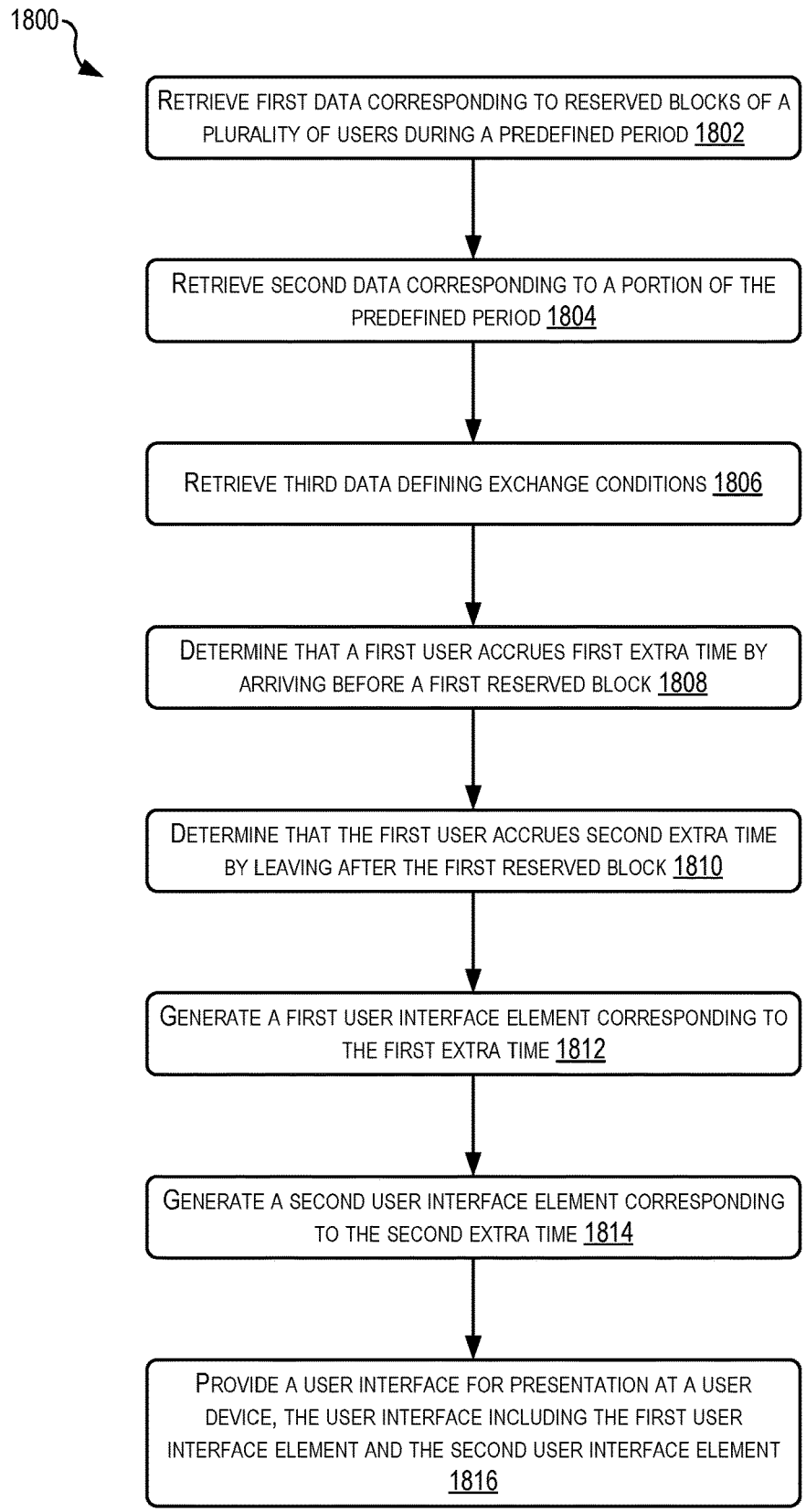
FIG. 18 is an example flowchart illustrating a process for aggregating data from disparate data sources for user interface customization, according to at least one example.

FIGS. 17 and 18 illustrate example flow diagrams showing respective processes 1700 and 1800, as described herein. These processes 1700 and 1800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium (e.g., storage devices), for example, in the form of a computer program comprising a plurality of instructions executable by one or more processors. The computer-readable storage medium is non-transitory.

FIG. 17 is an example flowchart illustrating a process 1700 for aggregating data from disparate data sources for user interface customization, according to at least one example. The process 1700 is performed by the server system 902 including the aggregation engine 904, the rendering engine 910, and the notification engine 922. The process 1700 in particular corresponds to a process by which users' activity event records, reserved blocks, and exchange conditions are analyzed to determine an overtime risk for the users.

The process 1700 begins at 1702 by the server system 902 retrieving first data corresponding to reserved blocks of a plurality of users during a predefined period. In some examples, the aggregation engine 904 may perform block 1702. The first data may be retrieved from a first database (e.g., the reserved block data store 912) associated with a first computer system. The predefined period may be user configurable and may be any suitable period such as a fixed number of hours, a day, a week, a month, multiple months, a year, etc. In some examples, the reserved blocks may correspond to blocks of time.

At 1704, the process 1700 includes the server system 902 retrieving second data corresponding to a portion of the predefined period. In some examples, the aggregation engine 904 may perform block 1704. The second data may be retrieved from a second database (e.g., the activity event data store 914) associated with a second computer system. The second computer system may be operated and managed by a third-party such as a time management vendor. The second data includes a plurality of activity events obtained from at least one capture device. For example, the second data may include punch data obtained from at least one time clock. In some examples, only a portion of the predefined period is relevant because while the first data may represent an entire period (e.g., a full weekly schedule), the second data may only represent actual blocks that have been noted based on activity event data (e.g., some portion of the full weekly schedule). In some examples, the first computer system may be operated by a first entity and the second computer system may be operated by a second entity that is distinct from the first entity.

At 1706, the process 1700 includes the server system 902 retrieving, third data defining exchange conditions. In some examples, the aggregation engine 904 may perform block 1706. The third data may be retrieved from a third database (e.g., exchange condition data store 916).

At 1708, the process 1700 includes the server system 902 determining first time for each of the plurality of users. In some examples, the aggregation engine 904 may perform block 1708. Determining the first time may be based at least in part on the first data from the first database, the second data from the second database, and the third data from the third database. In some examples, the first time may include blocks of time during which the plurality of users were productive, or blocks that are otherwise characterized as productive.

At 1710, the process 1700 includes the server system 902 determining second time for each of the plurality of users. In some examples, the aggregation engine 904 may perform block 1710. Determining the second time may be based at least in part on the first data from the first database. In some examples, the second time may include at least some of the reserved blocks. In particular, the second time may represent all scheduled time for the predefined time period.

At 1712, the process 1700 includes the server system 902 categorizing each user of the plurality of users into one of a plurality of categories by at least performing sub-process 1712. The sub-process 1712 includes at, 1714, the server system 902 determining a third time based on the first time and the second time. The third time may be determined for each respective user. In some examples, the aggregation engine 904 may perform block 1714. At 1716, the sub-process 1712 includes the server system 902 filtering the third time with respect to a set of levels (e.g., a set of thresholds). In some examples, the aggregation engine 904 may perform block 1716. At 1718, the sub-process 1712 includes the server system 902 assigning each user to one of a plurality of categories based at least in part on filtering the third time. In some examples, the aggregation engine 904 may perform block 1718. In some examples, the third time is a total expected time and includes a combination of the first time and the second time.

In some examples, a first level of the plurality of levels may be less than a first fixed value (e.g., 32), a second level of the plurality of levels may be greater than or equal to the first fixed value (e.g., 32), and a third level of the plurality of levels may be greater than a second fixed value (e.g., 40) that is greater than the first fixed value (e.g., 32).

At 1720, the process 1700 includes the server system 902 generating a first user interface element corresponding to a first category of the plurality of categories. In some examples, the rendering engine 910 may perform block 1720.

At 1722, the process 1700 includes the server system 902 providing a user interface for presentation at a user device that includes the first user interface element. In some examples, the rendering engine 910 may perform block 1722. The user interface element may be displayed in association with each user categorized into the first category. In some examples, other user interface elements are displayed in association with other users categorized into the second, third, and other categories.

In some examples, the process 1700 further includes the server system 902 generating, using the second data, a list including user identifiers and organizational unit identifiers. In this example, the user identifiers may be associated with the plurality of users and the organizational unit identifiers may be associated with organizational units at which the plurality of activity events occur. The process 1700 may further include the server system using the list to identify a subset of users of the plurality of users that recorded activity events at a particular organizational unit that is outside of their home organizational unit, generating a notification that identifies the subset of users, and providing the notification to a user device associated with a user of the particular organizational unit. The aggregation engine 904 may generate the list and identify the subset of users, and the notification engine 922 may generate the notification and provide the notification to the user device.

FIG. 18 is an example flowchart illustrating a process for aggregating data from disparate data sources for user interface customization, according to at least one example. The process 1800 is performed by the server system 902 including the aggregation engine 904, the rendering engine 910, and the notification engine 922. The process 1800 in particular corresponds to a process by which users' activity event records, reserved blocks, and exchange conditions are analyzed to determine accrual of extra time.

The process 1800 begins at 1802 by the server system 902 retrieving first data corresponding to reserved blocks of a plurality of users during a predefined period. In some examples, the aggregation engine 904 may perform the block 1802. The first data may be retrieved from a first database associated with a first computer system. Block 1802 may be performed in a manner similar to the block 1702.

At 1804, the process 1800 includes the server system 902 retrieving second data corresponding to a portion of the predefined period. In some examples, the aggregation engine 904 may perform block 1804. The second data may be retrieved from a second database associated with a second computer system. The second data may include a plurality of activity events obtained from at least one capture device (e.g., a punch clock). The block 1804 may be performed in a manner similar to the block 1704.

At 1806, the process 1800 includes the server system 902 retrieving third data defining exchange conditions. In some examples, the aggregation engine 904 performs block 1806. The third data may be retrieved from a third database, which may be associated with the first computer system, the second computer system, or a third computer system. The block 1806 may be performed in a manner similar to the block 1706.

At 1808, the process 1800 includes the server system 902 determining that a first user accrues first extra time by arriving before a first reserved block. In some examples, the aggregation engine 904 performs block 1808. The first user may be one of a plurality of users. The block 1808 may be determined based on the first data from the first database, the second data from the second database, and the third data from the third database.

At 1810, the process 1800 includes the server system 902 determining that the first user accrues second extra time by leaving after the first reserved block. In some examples, the aggregation engine 904 performs block 1810. The block 1810 may be determined based on the first data from the first database, the second data from the second database, and the third data from the third database.

At 1812, the process 1800 includes the server system 902 generating a first user interface element corresponding to the first extra time. In some examples, the rendering engine 910 performs block 1812.

At 1814, the process 1800 includes the server system 902 generating a second user interface element corresponding to the second extra time. In some examples, the rendering engine 910 performs block 1814.

At 1816, the process 1800 includes the server system 902 providing a user interface for presentation at a user device, the user interface comprising the first user interface element and the second user interface element. In some examples, the rendering engine 910 performs block 1816. The user interface elements may be displayed in association with the first user.

In some examples, the process 1800 further includes the server system 902 generating a notification that identifies the first user and at least one of the first extra time or the second extra time, and transmitting the notification to the user device. This may be performed by the notification engine 906.

In some examples, the user interface may include a timeline view that includes the first user interface element and the second user interface element, along with a productive time user interface element.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
    retrieving, from a first database associated with a first computer system, first data corresponding to reserved blocks of a plurality of users during a predefined period;
    retrieving, from a second database associated with a second computer system, second data corresponding to a portion of the predefined period, the second data comprising a plurality of activity actions obtained from at least one punch clock;
    retrieving, from a third database, third data defining exchange conditions;
    determining a number of times that each of the plurality of users violates an attendance policy of a plurality of attendance policies based at least in part on two or more of the first data from the first database, the second data from the second database, or the third data from the third database;
    identifying a subset of the plurality of users for whom a sum of the number of times exceeds a threshold;
    generating user interface elements corresponding to the subset of users of the plurality of users; and
    providing a user interface for presentation at a user device that includes the user interface elements displayed in association with each attendance policy of the plurality of attendance policies.

2. The computer-implemented method of claim 1, wherein the first data comprises scheduling data that indicates times at which users are scheduled for performing activities, wherein the second data comprises punch clock data that is associated with the users, and wherein the third data comprises pay code data.

3. The computer-implemented method of claim 2, wherein the attendance policy comprises a policy that requires recordation of at least one of an arrival, a departure, or a break via a punch clock at a facility, and wherein determining the number of times that each of the plurality of users violates the attendance policy comprises comparing the scheduling data for the respective user with the punch clock data for the respective user.

4. The computer-implemented method of claim 2, wherein the attendance policy comprises a policy that requires use of a punch clock within a particular department at a facility, and wherein determining the number of times that each of the plurality of users violates the attendance policy comprises comparing the pay code data for the respective user with the punch clock data for the respective user.

5. The computer-implemented method of claim 2, wherein the attendance policy comprises a policy that requires use of a particular punch clock for concluding a work period, and wherein determining the number of times that each of the plurality of users violates the attendance policy comprises comparing the pay code data for the respective user with the punch clock data for the respective user.

6. The computer-implemented method of claim 1, wherein the user interface elements identify at least one a number of none punch outs, a number of early punch-outs, a number of late punch-outs, a number of punch-outs in a different department, a number of contractor punch-outs, a number of short breaks, a number of long breaks, a total number of breaks, or a total number of meal breaks.

7. The computer-implemented method of claim 1, further comprising:
    generating a trending user interface element that represents trending data associated with at least one attendance policy and at least one user interface element of the user interface elements; and
    updating the user interface to include the trending user interface element for presentation at the user device responsive to a user action with respect to the at least one user interface element.

8. One or more non-transitory computer-readable media comprising computer-executable instructions that, when executed by one or more computer systems, cause the one or more computer systems to perform operations comprising:
    retrieving, from a first database associated with a first computer system, first data corresponding to reserved blocks of a plurality of users during a predefined period;
    retrieving, from a second database associated with a second computer system, second data corresponding to a portion of the predefined period, the second data comprising a plurality of activity actions obtained from at least one punch clock;
    retrieving, from a third database, third data defining exchange conditions;
    determining a number of times that each of the plurality of users violates an attendance policy of a plurality of attendance policies based at least in part on two or more of the first data from the first database, the second data from the second database, or the third data from the third database;
    identifying a subset of the plurality of users for whom a sum of the number of times exceeds a threshold;
    generating user interface elements corresponding to the subset of users of the plurality of users; and
    providing a user interface for presentation at a user device that includes the user interface elements displayed in association with each attendance policy of the plurality of attendance policies.

9. The one or more non-transitory computer-readable media of claim 8, wherein the first data comprises scheduling data that indicates times at which users are scheduled for performing activities, wherein the second data comprises punch clock data that is associated with the users, and wherein the third data comprises pay code data.

10. The one or more non-transitory computer-readable media of claim 9, wherein the attendance policy comprises a policy that requires recordation of at least one of an arrival, a departure, or a break via a punch clock at a facility, and wherein determining the number of times that each of the plurality of users violates the attendance policy comprises comparing the scheduling data for the respective user with the punch clock data for the respective user.

11. The one or more non-transitory computer-readable media of claim 9, wherein the attendance policy comprises a policy that requires use of a punch clock within a particular department at a facility, and wherein determining the number of times that each of the plurality of users violates the attendance policy comprises comparing the pay code data for the respective user with the punch clock data for the respective user.

12. The one or more non-transitory computer-readable media of claim 9, wherein the attendance policy comprises a policy that requires use of a particular punch clock for concluding a work period, and wherein determining the number of times that each of the plurality of users violates the attendance policy comprises comparing the pay code data for the respective user with the punch clock data for the respective user.

13. The one or more non-transitory computer-readable media of claim 8, wherein the user interface elements identify at least one a number of none punch outs, a number of early punch-outs, a number of late punch-outs, a number of punch-outs in a different department, a number of contractor punch-outs, a number of short breaks, a number of long breaks, a total number of breaks, or a total number of meal breaks.

14. The one or more non-transitory computer-readable media of claim 8, wherein the one or more non-transitory computer-readable media comprise further instructions that, when executed, further cause the one or more computer systems to perform operations comprising:
generating a trending user interface element that represents trending data associated with at least one attendance policy and at least one user interface element of the user interface elements; and
updating the user interface to include the trending user interface element for presentation at the user device responsive to a user action with respect to the at least one user interface element.

15. A system, comprising:
a memory configured to store computer-executable instructions; and
a processor configured to access the memory and execute the computer-executable instructions to at least:
retrieve, from a first database associated with a first computer system, first data corresponding to reserved blocks of a plurality of users during a predefined period;
retrieve, from a second database associated with a second computer system, second data corresponding to a portion of the predefined period, the second data comprising a plurality of activity actions obtained from at least one punch clock;
retrieve, from a third database, third data defining exchange conditions;
determine a number of times that each of the plurality of users violates an attendance policy of a plurality of attendance policies based at least in part on two or more of the first data from the first database, the second data from the second database, or the third data from the third database;
identify a subset of the plurality of users for whom a sum of the number of times exceeds a threshold;
generate user interface elements corresponding to the subset of users of the plurality of users; and
provide a user interface for presentation at a user device that includes the user interface elements displayed in association with each attendance policy of the plurality of attendance policies.

16. The system of claim 15, wherein the first data comprises scheduling data that indicates times at which users are scheduled for performing activities, wherein the second data comprises punch clock data that is associated with the users, and wherein the third data comprises pay code data.

17. The system of claim 16, wherein the attendance policy comprises a policy that requires recordation of at least one of an arrival, a departure, or a break via a punch clock at a facility, and wherein determining the number of times that each of the plurality of users violates the attendance policy comprises comparing the scheduling data for the respective user with the punch clock data for the respective user.

18. The system of claim 16, wherein the attendance policy comprises a policy that requires use of a punch clock within a particular department at a facility, and wherein determining the number of times that each of the plurality of users violates the attendance policy comprises comparing the pay code data for the respective user with the punch clock data for the respective user.

19. The system of claim 16, wherein the attendance policy comprises a policy that requires use of a particular punch clock for concluding a work period, and wherein determining the number of times that each of the plurality of users violates the attendance policy comprises comparing the pay code data for the respective user with the punch clock data for the respective user.

20. The system of claim 15, wherein the memory comprises further computer-executable instructions, and the processor is configured to access the memory and execute the further computer-executable instructions to:
generate a trending user interface element that represents trending data associated with at least one attendance policy and at least one of the user interface elements; and
update the user interface to include the trending user interface element for presentation at the user device responsive to a user action with respect to the at least one user interface element.

* * * * *